(12) United States Patent (10) Patent No.: US 12,674,508 B2
Fujioka et al. (45) Date of Patent: Jul. 7, 2026

(54) MANUFACTURING METHOD OF GEAR BOX AND MANUFACTURING METHOD OF ROTATING MACHINE

(71) Applicant: KOBE STEEL, LTD., Kobe (JP)

(72) Inventors: Komei Fujioka, Takasago (JP); Shigeru Matsuda, Takasago (JP)

(73) Assignee: KOBE STEEL, LTD., Kobe (JP)

( * ) Notice: Subject to any disclaimer, the term of this patent is extended or adjusted under 35 U.S.C. 154(b) by 0 days.

(21) Appl. No.: 19/065,516

(22) Filed: Feb. 27, 2025

(65) Prior Publication Data

US 2025/0297675 A1    Sep. 25, 2025

(30) Foreign Application Priority Data

Mar. 21, 2024    (JP) ................................. 2024-045495

(51) Int. Cl.
F16H 57/023 (2012.01)
F16H 57/02 (2012.01)

(52) U.S. Cl.
CPC . F16H 57/023 (2013.01); F16H 2057/02017 (2013.01)

(58) Field of Classification Search
CPC ........... F16H 57/023; F16H 2057/0087; F16H 2057/02017; F04D 25/163
See application file for complete search history.

(56) References Cited

U.S. PATENT DOCUMENTS

| | | | | |
|---|---|---|---|---|
| 5,485,719 A | * | 1/1996 | Wulf | F25J 3/04866 60/785 |
| 6,050,780 A | * | 4/2000 | Hasegawa | F04D 25/163 417/423.5 |
| 2003/0123972 A1 | * | 7/2003 | Quetel | F04D 25/163 415/1 |

FOREIGN PATENT DOCUMENTS

| | | | | |
|---|---|---|---|---|
| JP | H09-119378 A | | 5/1997 | |
| KR | 100965111 B1 | * | 6/2010 | H02K 7/00 |

OTHER PUBLICATIONS

Machine translation of KR 100965111 B1, obtained from FIT database (Year: 2010).*

* cited by examiner

*Primary Examiner* — Thomas C Diaz

(74) *Attorney, Agent, or Firm* — Studebaker Brackett PLLC

(57) ABSTRACT
A manufacturing method of a gear box for a rotating machine for transmitting power of a motor, the gear box including a bull gear connected to an input shaft of the motor and a pinion gear meshing with the bull gear, forms the bull gear and the pinion gear based on a design result determined using a designing method of a gear box. In the designing method of a gear box, pitch circle diameters of the bull gear and the pinion gear are determined such that a rotation speed of the pinion gear is the same and a center-to-center distance of a bull gear and the pinion gear is the same regardless of a frequency of AC power supplied to the motor.

12 Claims, 11 Drawing Sheets

FIG.10

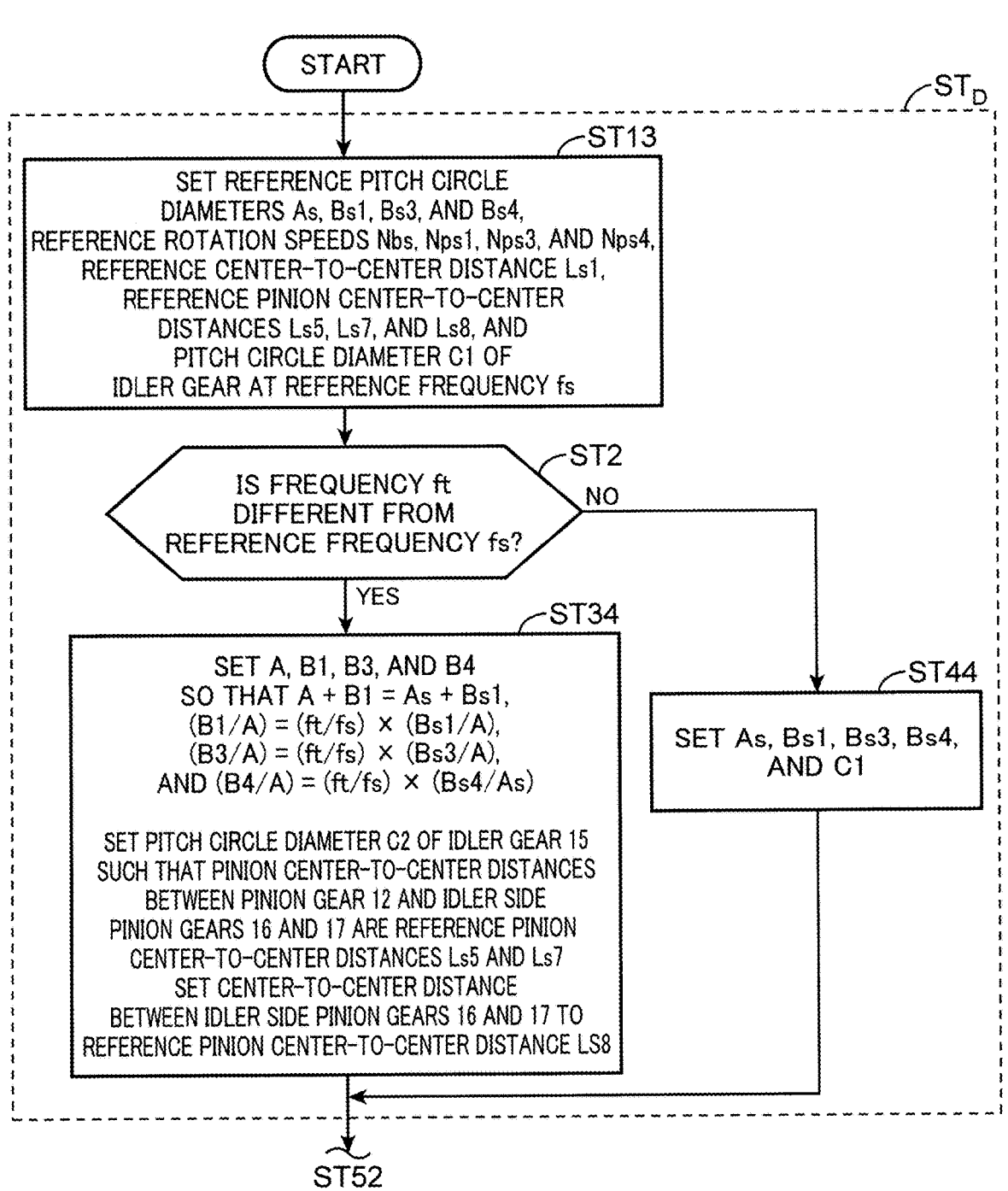

START

ST$_D$

ST13

SET REFERENCE PITCH CIRCLE
DIAMETERS As, Bs1, Bs3, AND Bs4,
REFERENCE ROTATION SPEEDS Nbs, Nps1, Nps3, AND Nps4,
REFERENCE CENTER-TO-CENTER DISTANCE Ls1,
REFERENCE PINION CENTER-TO-CENTER
DISTANCES Ls5, Ls7, AND Ls8, AND
PITCH CIRCLE DIAMETER C1 OF
IDLER GEAR AT REFERENCE FREQUENCY fs

ST2

IS FREQUENCY ft
DIFFERENT FROM
REFERENCE FREQUENCY fs?

NO

YES

ST34

SET A, B1, B3, AND B4
SO THAT A + B1 = As + Bs1,
(B1/A) = (ft/fs) × (Bs1/A),
(B3/A) = (ft/fs) × (Bs3/A),
AND (B4/A) = (ft/fs) × (Bs4/As)

SET PITCH CIRCLE DIAMETER C2 OF IDLER GEAR 15
SUCH THAT PINION CENTER-TO-CENTER DISTANCES
BETWEEN PINION GEAR 12 AND IDLER SIDE
PINION GEARS 16 AND 17 ARE REFERENCE PINION
CENTER-TO-CENTER DISTANCES Ls5 AND Ls7
SET CENTER-TO-CENTER DISTANCE
BETWEEN IDLER SIDE PINION GEARS 16 AND 17 TO
REFERENCE PINION CENTER-TO-CENTER DISTANCE LS8

ST44

SET As, Bs1, Bs3, Bs4,
AND C1

ST52

MANUFACTURING METHOD OF GEAR BOX AND MANUFACTURING METHOD OF ROTATING MACHINE

FIELD OF INVENTION

The present invention relates to a manufacturing method of a gear box and a manufacturing method of a rotating machine.

BACKGROUND ART

Conventionally, a geared centrifugal compressor is known as disclosed in JP H9-119378 A. As disclosed in JP H9-119378 A, a centrifugal compressor includes a bull gear and a pinion gear. A motor that generates rotational driving force is connected to the bull gear. The pinion gear meshes with the bull gear and is connected to an impeller.

SUMMARY OF THE INVENTION

In a rotating machine in which a bull gear is rotated by a motor supplied with AC power, a rotation speed of the motor changes according to a frequency of the supplied power. For this reason, in a rotating machine according to a conventional technique, a rotation speed of an impeller changes depending on a difference in frequency of supplied power. Therefore, conventionally, even if configurations of a bull gear, a pinion gear, and the like in a rotating machine are the same, a processing amount of gas changes only by a change in frequency of power supplied to a motor.

Here, in order to prevent a rotation speed of an impeller from changing even in a case where a frequency of supplied power is different, it is conceivable to adjust a gear diameter of a bull gear and a gear diameter of a pinion gear.

However, in a case where a gear diameter of a bull gear, a pinion gear, or the like is adjusted in order to make a rotation speed of an impeller constant regardless of the frequency, main body size of a rotating machine changes. That is, in a case where a gear diameter of a bull gear or a pinion gear is changed, a distance between a center axis of the bull gear and a center axis of the pinion gear, or a center-to-center distance of a plurality of pinion gears may change. In a case where main body size changes in this manner, layout design of auxiliary components such as a pipe is required for each main body size, and manufacturing cost increases.

The present invention has been made in view of the above problem, and an object of the present invention is to prevent a change in main body size of a rotating machine while making a rotation speed of an impeller the same regardless of a frequency of a power supply.

A manufacturing method according to one aspect of the present disclosure is a manufacturing method of a gear box for a rotating machine for transmitting power of a motor. The gear box includes a bull gear connected to an input shaft of a motor, and a pinion gear meshing with the bull gear.

The manufacturing method according to the present aspect includes a step of forming the bull gear and a step of forming the pinion gear. In the manufacturing method according to the present aspect, the step of forming the bull gear and the step of forming the pinion gear are executed using a design result determined through a design process including a reference setting step and a determination step. In the reference setting step, a first reference center-to-center distance and a first reference rotation speed defined in a case where a frequency of AC power supplied to the motor is a predetermined frequency are set. The first reference center-to-center distance is a distance between a center axis of the bull gear and a center axis of the pinion gear. Further, the first reference rotation speed is a rotation speed of the pinion gear defined in a case where a frequency of AC power supplied to the motor is a predetermined frequency.

In the determination step, in a case where a frequency of AC power supplied to the motor is a frequency different from the predetermined frequency, pitch circle diameters of the bull gear and the pinion gear are determined so as to satisfy Conditions a1 and a2 below.

(Condition a1) A center-to-center distance, which is a distance between the center axis of the bull gear and the center axis of the pinion gear, is set to be the same as the first reference center-to-center distance.

(Condition a2) A rotation speed of the pinion gear is set to be the same as the first reference rotation speed.

BRIEF DESCRIPTION OF THE DRAWINGS

FIG. 10 is a process diagram illustrating the designing method of the gear box and the manufacturing method of the centrifugal compressor according to another variation of the second embodiment.

DETAILED DESCRIPTION

Hereinafter, an embodiment will be described with reference to the drawings. Note that an embodiment described below exemplarily illustrates the present invention, and the present invention is not limited to the embodiment below except for an essential configuration of the present invention.

First Embodiment

1. Configuration of Centrifugal Compressor 1

A configuration of a centrifugal compressor (rotating machine) 1 manufactured using a manufacturing method according to a first embodiment will be described with reference to FIG. 1. Note that, in FIG. 1, only a partial configuration of the centrifugal compressor 1 is illustrated.

Figure 1:
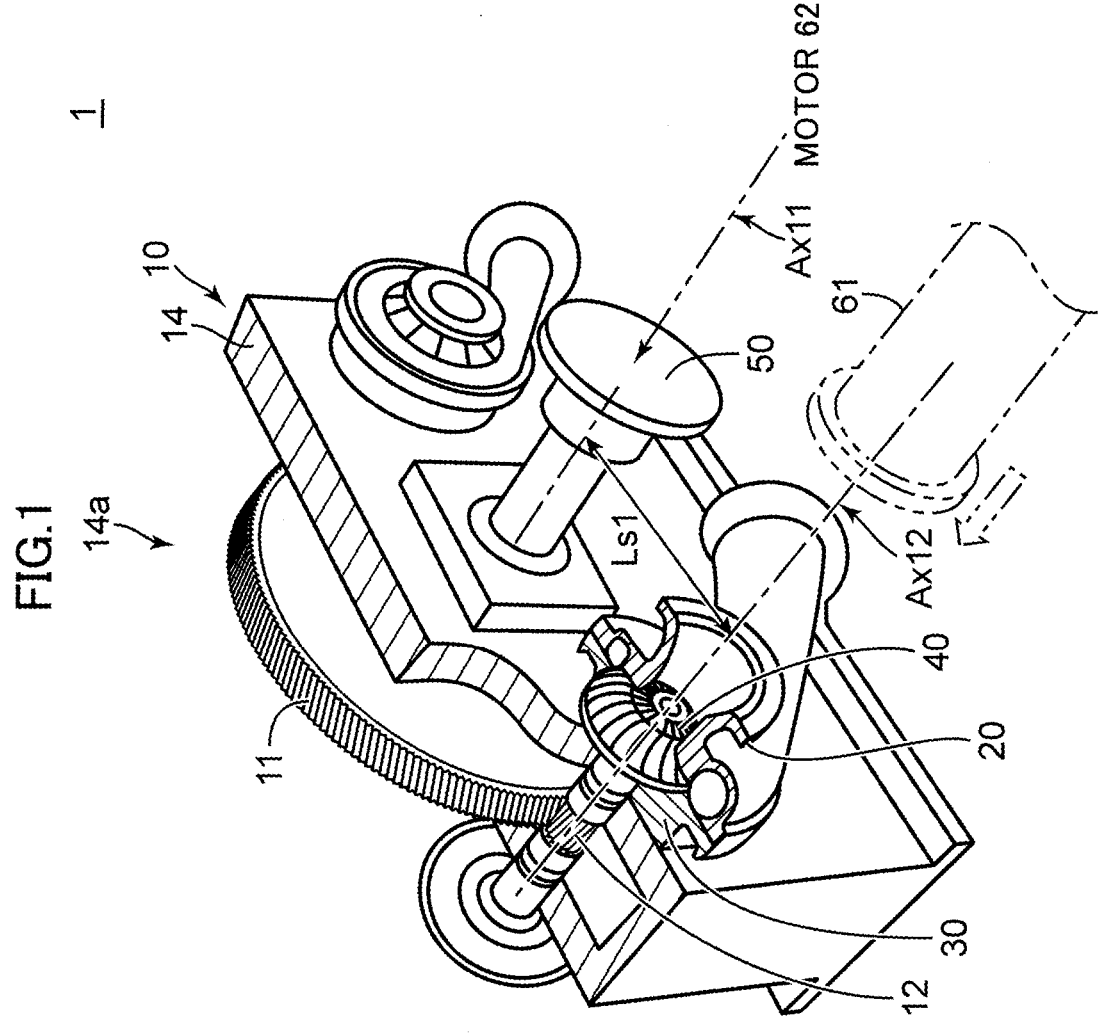
FIG. 1 is a perspective view illustrating a partial configuration of a centrifugal compressor manufactured by a manufacturing method according to a first embodiment.

As illustrated in FIG. 1, the centrifugal compressor 1 includes an impeller 40 and a gear box 10 that transmits a rotational driving force for rotating the impeller 40. The gear box 10 includes a bull gear 11, a pinion gear 12, and a gear case 14 covering the outside of the gears 11 and 12.

The gear case 14 is a case member having an accommodation space 14a that accommodates the bull gear 11 and the pinion gear 12. The gear case 14 is provided with a through hole penetrating an outer wall of the gear case 14 for each of the bull gear 11 and the pinion gear 12. Note that, in practice, the gear case 14 includes two split bodies that can be vertically separated. The bull gear 11 and the pinion gear 12 are arranged such that their shaft portions pass through the through hole of the gear case 14. That is, the bull gear 11 and the pinion gear 12 are pivotally supported by the gear case 14 via a bearing.

A coupling hub 50 for connecting to a motor 62 is attached to the bull gear 11 outside the gear case 14. The bull gear 11 is rotationally driven by receiving a rotational driving force of the motor 62. Note that the centrifugal compressor 1 of the present embodiment employs the motor 62 that is rotationally driven by receiving supply of AC power.

The bull gear 11 and the pinion gear 12 are arranged such that their shaft portions are parallel to each other. Then, gear portions of the bull gear 11 and the pinion gear 12 mesh with each other in the accommodation space 14a of the gear case 14.

One or two of the impellers 40 are attached to one or both end portions of the pinion gear 12 outside the gear case 14. The same applies to an embodiment below. The impeller 40 is accommodated in a space formed by a casing 20 and a casing cover 30.

The space formed by the casing 20 and the casing cover 30 includes, in addition to a portion in which the impeller 40 is accommodated, a diffuser (not illustrated) provided on the outer side in the radial direction than the impeller 40, and a spiral scroll portion provided on the further outer side in the radial direction than the diffuser. Note that the diffuser is not necessarily provided.

In the centrifugal compressor 1, gas to which kinetic energy is applied by rotation of the impeller 40 is decelerated and boosted by the diffuser and sent to the scroll portion. In FIG. 1, the centrifugal compressor 1 is illustrated in a state where the gear case 14, the casing 20, and the casing cover 30 are partially notched.

The casing cover 30 is fastened to the gear case 14 using a fastening member (not illustrated) in a portion where a shaft portion of the pinion gear 12 extends from the gear case 14.

A pipe 61 is connected to the casing 20 on the side opposite to the side to which the casing cover 30 is attached. The pipe 61 is arranged such that a pipe axis coincides with a center axis Ax12 of the pinion gear 12 at a connection portion with the casing 20. The pipe 61 is attached to the centrifugal compressor 1 as an example of an auxiliary component.

As described above, since the bull gear 11 and the pinion gear 12 are arranged such that shaft portions are parallel to each other, a center axis Ax11 of the bull gear 11 and the center axis Ax12 of the pinion gear 12 are parallel to each other. The same applies to the bull gear and the pinion gear in other embodiments.

Specifically, the pinion gear 12 is arranged such that the center axis Ax12 of the pinion gear 12 is parallel to and separated from the center axis Ax11 of the bull gear 11 by a distance (center-to-center distance) Ls1.

In the centrifugal compressor 1 having the above configuration, the bull gear 11 rotates when AC power is supplied to the motor 62. The pinion gear 12 that meshes with the bull gear 11 in the accommodation space 14a of the gear case 14 rotates at a rotation speed corresponding to the rotation speed of the bull gear 11. Then, the impeller 40 attached to a tip of the pinion gear 12 rotates at the same rotation speed as the pinion gear 12, and applies kinetic energy to gas sucked into a space formed by the casing 20 and the casing cover 30.

2. Manufacturing Method of Centrifugal Compressor 1

A manufacturing method $ST_{MC}$ of the centrifugal compressor 1 according to the present embodiment will be described with reference to FIG. 2.

Figure 2:
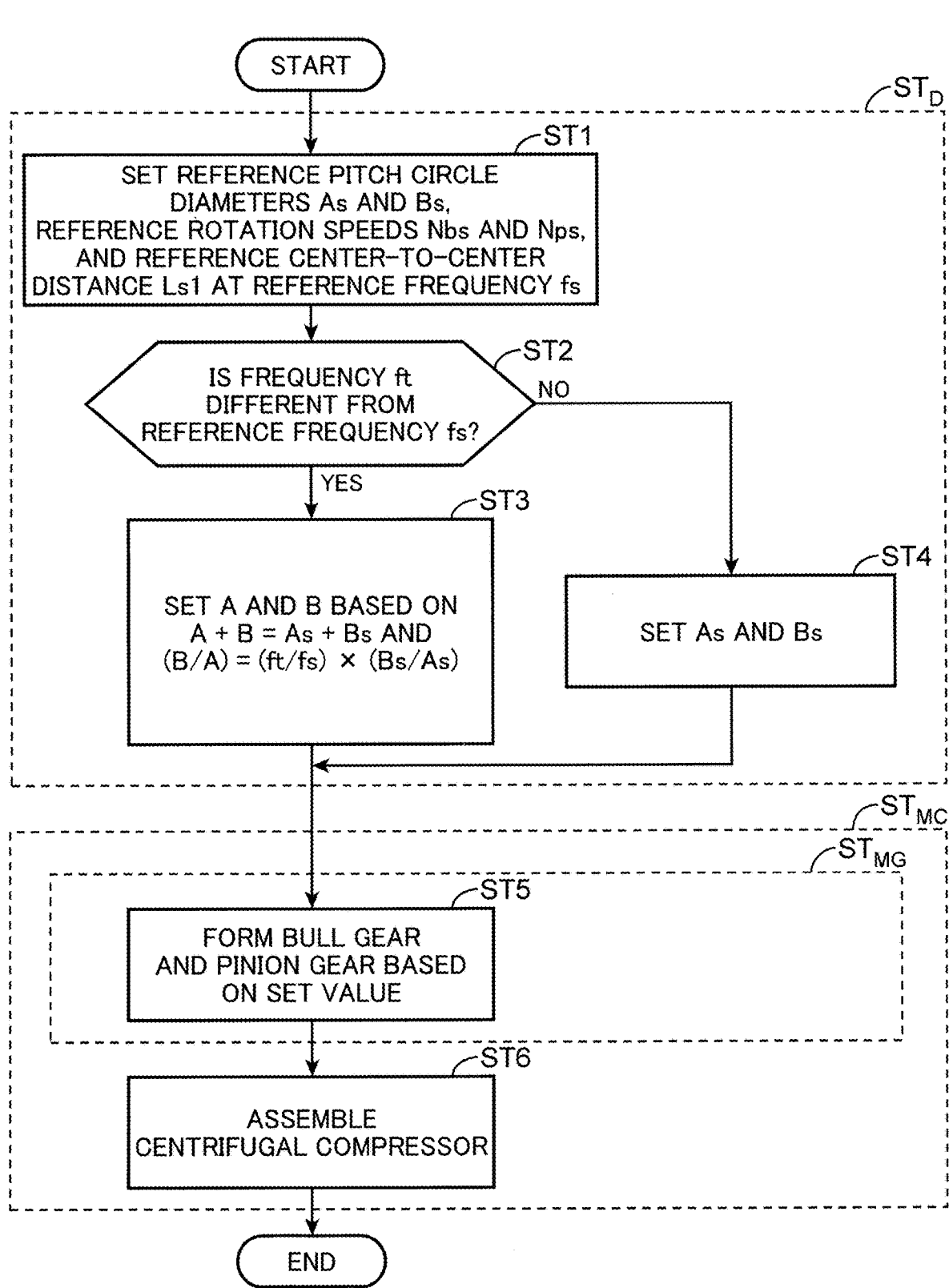
FIG. 2 is a process diagram illustrating a designing method of a gear box and a manufacturing method of a centrifugal compressor.

As illustrated in FIG. 2, in the manufacturing method $ST_{MC}$ of the centrifugal compressor 1, the bull gear 11 and the pinion gear 12 are formed using a design result determined by a designing method $ST_D$ of the gear box 10 (step ST5: manufacturing method $ST_{MG}$ of the gear box 10). Specifically, the bull gear 11 and the pinion gear 12 having a pitch circle diameter determined to satisfy Conditions 1-1 and 1-2 described later are formed. Next, the centrifugal compressor 1 is assembled by assembling the bull gear 11 and the pinion gear 12 to the gear case 14, the impeller 40, and other components (step ST6).

3. Designing Method $ST_D$ of Gear Box 10

The designing method $ST_D$ of the gear box 10 according to the present embodiment will be described with reference to FIGS. 2, 3A, and 3B. Note that, in FIGS. 3A and 3B, only a pitch circle diameter is illustrated. The same applies to other similar drawings.

Figure 3A:
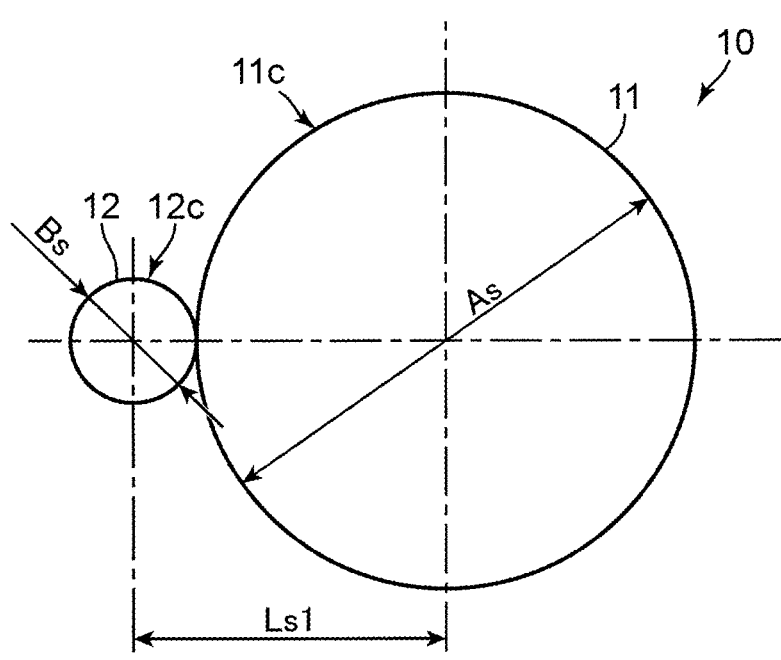
FIG. 3A is a schematic diagram illustrating a bull gear and a pinion gear in a case where a frequency of AC power supplied to a motor is a reference frequency.

FIG. 3A is a diagram illustrating a relationship between the bull gear 11 and the pinion gear 12. In the designing method $ST_D$ of the gear box 10, first, the bull gear 11 and the pinion gear 12 serving as references are set. That is, in the designing method $ST_D$ of the gear box 10 according to the present embodiment, the gear box 10 is designed such that a center-to-center distance is the same as the reference center-to-center distance (first reference center-to-center distance) Ls1 while a rotation speed of the impeller 40 is the same regardless of a frequency of AC power supplied to the motor 63. For this purpose, first, the bull gear 11 and the pinion gear 12 serving as references are set.

The bull gear 11 serving as a reference is set to rotate at a predetermined rotation speed when a frequency of AC power supplied to the motor 62 is a predetermined frequency fs (for example, 50 Hz). Further, the pinion gear 12 serving as a reference is set so as to mesh with the bull gear 11 serving as a reference (the modules are set to be the same).

Hereinafter, the predetermined frequency fs defined in setting the bull gear 11 and the pinion gear 12 as references is referred to as "reference frequency fs".

In FIG. 3A, a pitch circle of the bull gear 11 is indicated by a reference numeral 11$c$. A pitch circle of the pinion gear 12 is indicated by a reference numeral 12$c$. A diameter of the pitch circle 11$c$ at the reference frequency fs is defined as "As" (hereinafter, referred to as "reference pitch circle diameter As"). A diameter of the pitch circle 12$c$ at the reference frequency fs is defined as "Bs" (hereinafter, referred to as "reference pitch circle diameter Bs"). A center-to-center distance, which is a distance between a center axis of the bull gear 11 and a center axis of the pinion gear 12 at the reference frequency fs, is indicated by "Ls1" (hereinafter, referred to as "reference center-to-center distance Ls1").

Here, in a case where the bull gear 11 rotates at a predetermined rotation speed Nbs by the motor 62 supplied with AC power of the reference frequency fs, a reference pitch circle diameter Bs is set such that a rotation speed (also a rotation speed of the impeller 40 attached to the pinion gear 12) of the pinion gear 12 is a predetermined rotation speed Nps. Hereinafter, the rotation speed Nbs is referred to as "reference rotation speed Nbs", and the rotation speed Nps is referred to as "reference rotation speed Nps". The reference rotation speed Nps is "first reference rotation speed".

As illustrated in FIG. 2, in the designing method $ST_D$ of the gear box 10, first, in step ST1 (reference setting step), reference pitch circle diameters As and Bs, a reference rotation speed of the bull gear 11 and the pinion gear 12, and the reference center-to-center distance Ls1 are set.

Next, it is determined whether or not a frequency f of power input to the attached motor 62 is the same as the reference frequency fs in the specifications of the gear box 10 to be designed (step ST2).

In a case where the frequency f is the same as the reference frequency fs (step ST2: NO), the bull gear 11 and the pinion gear 12 are designed using the reference pitch circle diameters As and Bs (step ST4: determination step). Then, steps ST5 and ST6 of the manufacturing method $ST_{MC}$ are executed.

Next, a case where the frequency f is different from the reference frequency fs (for example, 60 Hz) will be described (step ST2: YES). In description below, in a case of being distinguished from the reference frequency fs, the frequency f is referred to as "target frequency ft". FIG. 3B is a diagram illustrating a relationship between the bull gear 11 and the pinion gear 12 at the target frequency ft.

Figure 3B:
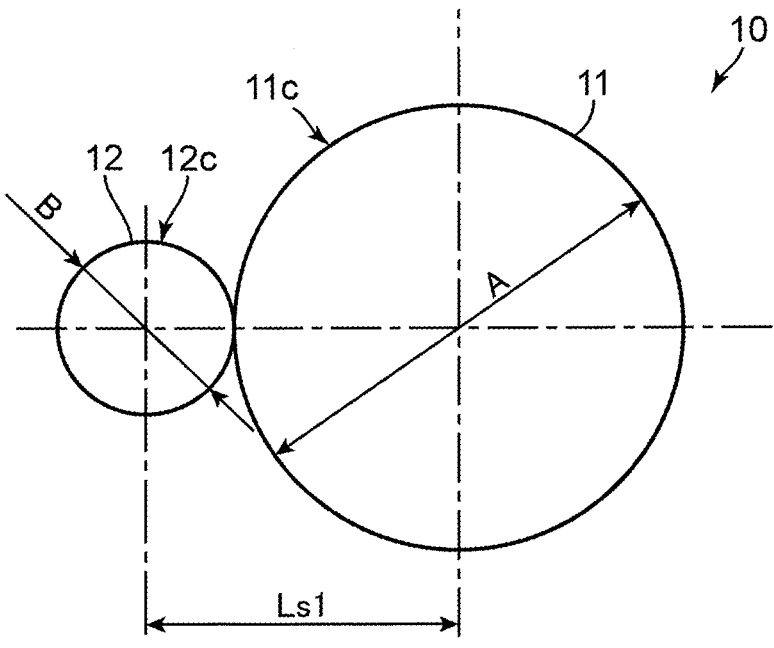
FIG. 3B is a schematic diagram illustrating the bull gear and the pinion gear in a case where the frequency is different from the reference frequency.

In FIG. 3B, in the gear box 10 to be designed, a diameter (pitch circle diameter) of the pitch circle 11$c$ of the bull gear 11 at the target frequency ft is indicated by "A", and a diameter (pitch circle diameter) of the pitch circle 12$c$ of the pinion gear 12 is indicated by "B". The pitch circle diameters A and B of the bull gear 11 and the pinion gear 12 at the target frequency ft are determined based on Conditions 1-1 and 1-2 below.

(Condition 1-1) A center-to-center distance of the bull gear 11 and the pinion gear 12 is the same as the reference center-to-center distance Ls1 set in step ST1.

Therefore, a relationship below is established between the pitch circle diameters As and Bs of the bull gear 11 and the pinion gear 12 at the reference frequency fs and the pitch circle diameters A and B of the bull gear 11 and the pinion gear 12 at the target frequency ft.

$$A+B=As+Bs \qquad \text{(Equation 1-1)}$$

(Condition 1-2) A rotation speed Np of the pinion gear 12 at the target frequency ft is the same as the reference rotation speed Nps set in step ST1, and a rotation speed Nb of the bull gear 11 is (ft/fs)×Nbs.

Therefore, Nb/Np=(ft/fs) Nbs/Nps. Further, in consideration of a speed transmission ratio, Nb/Np=B/A holds between rotation speeds and pitch circle diameters of the bull gear 11 and the pinion gear 12 in a case of the target frequency ft, and Nbs/Nps=Bs/As holds in a case of the reference frequency fs, and for this reason, a relationship below is derived.

$$(B/A)=(ft/fs)\times(Bs/As) \qquad \text{(Equation 1-2)}$$

The pitch circle diameters A and B of the bull gear 11 and the pinion gear 12 can be determined based on Equations 1-1 and 1-2 (step ST3: determination step). Note that the pitch circle diameters A and B may be finely adjusted based on a spiral angle and a addendum modification coefficient of the bull gear 11 and the pinion gear 12 (the same applies to other embodiments).

Note that determination of the pitch circle diameters A and B in step ST3 is based on the premise that the frequency f of power input to the motor 62 is different from the reference frequency fs, but other design conditions are the same (typically, models are the same). For this reason, in actual design of the gear box 10, other design conditions such as processed air volume may be considered.

Further, regarding the bull gear 11 and the pinion gear 12 formed based on the designing method $ST_D$ of the gear box 10 according to the present embodiment, the center-to-center distance between them is not necessarily strictly the same as the reference center-to-center distance Ls1. A rotation speed of the pinion gear 12 is not necessarily strictly the same as the reference rotation speed Nps.

4. Advantageous Effect

In the manufacturing method $ST_{MC}$ of the gear box 10 according to the present embodiment, even in a case where a frequency of a power supply (frequency of AC power supplied to the motor 62) is the frequency f different from the reference frequency fs, the pitch circle diameters A and B are determined so as to satisfy Conditions 1-1 and 1-2, and the bull gear 11 and each pinion gear 12 are formed (step ST5 is executed) using a result of the determination. By the above, in the manufacturing method $ST_{MC}$ of the gear box 10 according to the present embodiment, even if a rotation speed of the bull gear 11 changes due to a difference in a frequency of a power supply, the rotation speed Np of the impeller 40 can be made the same as the reference rotation speed Nps, and a center-to-center distance between the bull gear 11 and the pinion gear 12 can be made the same as the reference center-to-center distance Ls1. Therefore, in the manufacturing method $ST_{MC}$ of the gear box 10 according to the present embodiment, it is possible to prevent main body size of the centrifugal compressor 1 including the gear box 10 from changing, and it is possible to achieve commonization of auxiliary components such as the pipe 61. A relative position between the pipe 61 and the motor 62 can also be made the same regardless of a frequency of AC power supplied to the motor 62.

Variation of First Embodiment

A designing method $ST_D$ of the gear box 10 according to a variation of the first embodiment will be described with reference to FIGS. 4, 5A, and 5B. Note that the same configuration as that of the first embodiment is employed for a portion not illustrated in FIGS. 5A and 5B in a configuration of the gear box 10 to be designed by the designing method $ST_D$ according to the present variation. Further, similarly to the first embodiment, the gear box 10 according to the present variation is also incorporated as a partial configuration of the centrifugal compressor 1.

Figure 5A:
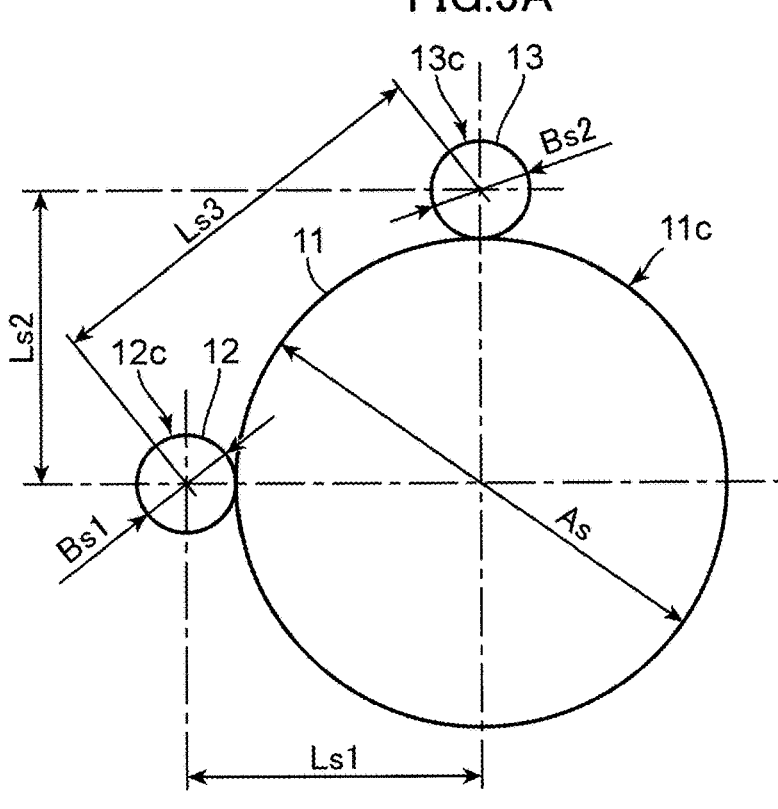
FIG. 5A is a schematic diagram illustrating the bull gear and the pinion gear in a case where a frequency of AC power supplied to the motor is the reference frequency.

FIG. 5A is a diagram illustrating a relationship between the bull gear 11 and the pinion gears 12 and 13 at reference frequency fs. In the gear box 10 to be designed by the designing method $ST_D$ according to the present variation, in addition to the pinion gear 12, another one, the pinion gear 13 meshing with the bull gear 11 is arranged to be shifted by 90 degrees. Note that arrangement of the pinion gears 12 and 13 with respect to the bull gear 11 may be optionally set. Further, although not illustrated, the impeller 40 is also connected to the pinion gear 13.

In FIG. 5A, a reference pitch circle diameter of the pitch circle 11c of the bull gear 11 is indicated by "As". A reference pitch circle diameter of the pitch circle 12c of the pinion gear 12 is indicated by "Bs1". A reference center-to-center distance between the bull gear 11 and the pinion gear 12 is indicated by "Ls1". A reference pitch circle diameter of a pitch circle 13c of the pinion gear 13 is indicated by "Bs2". A reference center-to-center distance (second center-to-center distance) between a center axis of the bull gear 11 and a center axis of the pinion gear 13 is indicated by "Ls2". A pinion center-to-center distance, which is a distance between a center axis of the pinion gear 12 and a center axis of the pinion gear 13, is indicated by "Ls3" (hereinafter, referred to as "reference pinion center-to-center distance Ls3").

Here, the reference pitch circle diameter Bs1 of the pinion gear 12 and the reference pitch circle diameter Bs2 of the pinion gear 13 are set so that the pinion gears 12 and 13 rotate at a reference rotation speed Nps1 and a reference rotation speed Nps2, respectively, in a case where the bull gear 11 rotates at the predetermined rotation speed Nbs by the motor 62 of the reference frequency fs.

Figure 4:
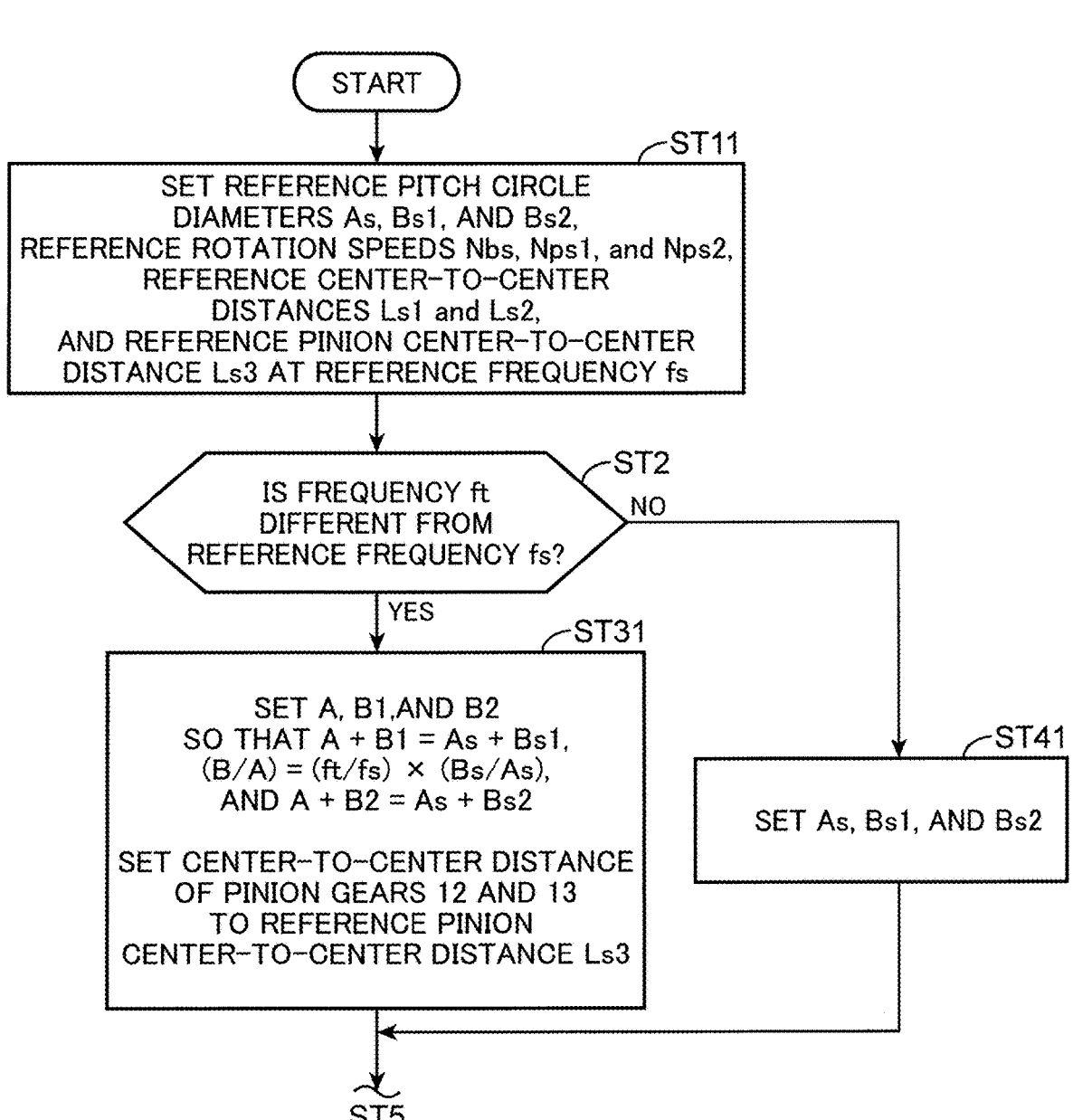
FIG. 4 is a process diagram illustrating a designing method of the gear box and a manufacturing method of the centrifugal compressor according to a variation of the first embodiment.
Figure 5B:
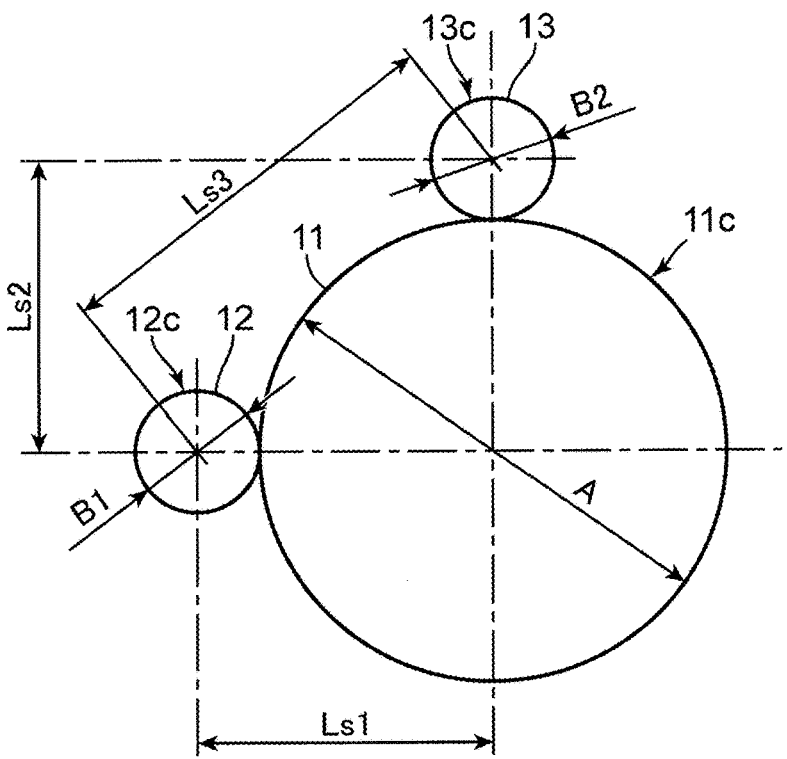
FIG. 5B is a schematic diagram illustrating the bull gear and the pinion gear in a case where the frequency is different from the reference frequency.

As illustrated in FIG. 4, in the designing method $ST_D$ of the gear box 10, the reference pitch circle diameters As, Bs1, and Bs2, the reference rotation speeds Nbs, Nps1, and Nps2 of the bull gear 11 and the pinion gears 12 and 13, the reference center-to-center distances Ls1 and Ls2, and the reference pinion center-to-center distance Ls3 are set in step ST11 (reference setting step).

Next, it is determined whether or not the frequency f of power input to the motor 62 is the same as the reference frequency fs (step ST2).

In a case where the frequency f is the same as the reference frequency fs (step ST2: NO), the bull gear 11 and the pinion gears 12 and 13 are designed using the reference pitch circle diameters As, Bs1, and Bs2 set in advance (step ST41: determination step). Then, steps ST5 and ST6 (see FIG. 2) of the manufacturing method $ST_{MC}$ are executed.

Next, a case where the frequency f (for example, 60 Hz) is different from the reference frequency fs will be described (step ST2: YES). In description below, in a case of being distinguished from the reference frequency fs, the frequency f is referred to as the target frequency ft. FIG. 5B is a diagram illustrating a relationship between the bull gear 11 and the pinion gears 12 and 13 at the target frequency ft.

The pitch circle diameters A and B1 of the bull gear 11 and any one of the pinion gear 12 at the target frequency ft are determined based on Conditions 2-1 and 2-2 below which are the same as Conditions 1-1 and 1-2 described above.

(Condition 2-1) A center-to-center distance of the bull gear 11 and the pinion gear 12 is the same as the reference center-to-center distance Ls1 set in step ST1.

(Condition 2-2) A rotation speed Np1 of the pinion gear 12 at the target frequency ft is the same as the reference rotation speed Nps1 referred to in step ST11, and the rotation speed Nb of the bull gear 11 is (ft/fs)×Nbs.

Therefore, Equations 2-1 and 2-2 below are established.

$$A + B1 = As + Bs1 \tag{Equation 2-1}$$

$$(B1/A) = (ft/fs) \times (Bs1/As) \tag{Equation 2-2}$$

The pitch circle diameters A and B1 of the bull gear 11 and the pinion gear 12 are determined based on Equations 2-1 and 2-2.

Furthermore, Conditions 2-3 and 2-4 below similar to Conditions 2-1 and 2-2 are set between the pitch circle diameters A and B2 of the bull gear 11 and another one of the pinion gear 13 at the target frequency ft.

(Condition 2-3) A center-to-center distance of the bull gear 11 and another one of the pinion gear 13 is the same as the reference center-to-center distance Ls2 set in step ST11.

(Condition 2-4) A rotation speed Np2 of another one of the pinion gear 13 at the target frequency ft is the same as the reference rotation speed Nps2 referred to in step ST11, and the rotation speed Nb of the bull gear 11 is (ft/fs)×Nbs.

Equation 2-3 similar to Equation 2-1 is established based on Condition 2-3.

$$A + B2 = As + Bs2 \tag{Equation 2-3}$$

The pitch circle diameter B2 of another one of the pinion gear 13 can be determined based on the pitch circle diameter A of the bull gear 11 obtained by Equations 2-1 and 2-2 and Equation 2-3.

Note that since Equation 2-4 similar to Equation 2-2 is established based on Condition 2-4, the pitch circle diameter B2 of another one of the pinion gear 13 may be determined based on the pitch circle diameter A of the bull gear 11 obtained by Equations 2-1 and 2-2 and Equation 2-4.

$$(B2/A) = (ft/fs) \times (Bs2/As) \tag{Equation 2-4}$$

(Condition 2-5) A pinion center-to-center distance, which is a distance between center axes of two of the pinion gears 12 and 13, is the same as the reference pinion center-to-center distance Ls3.

Based on Condition 2-5, arrangement of the pinion gears 12 and 13 is determined so that a relative position between the pinion gears is the same as that in a case of the reference frequency fs (step ST31: determination step).

As described above, also in the designing method $ST_D$ and the manufacturing methods $ST_{MG}$ and $ST_{MC}$ of the gear box 10 according to the present variation, it is possible to prevent main body size of the centrifugal compressor 1 including the gear box 10 from changing, and it is possible to achieve commonization of auxiliary components such as the pipe 61.

In a variation of the first embodiment, the designing method $ST_D$ of the gear box 10 according to the above aspect can also be applied to manufacture of the gear box 10 including three or more pinion gears meshing with the bull gear 11. In description below, only a difference from the designing method described with reference to FIG. 4 will be described. Other designing methods are similar to the designing methods described with reference to FIG. 4. That is, in step ST32 (determination step), a pitch circle diameter of each pinion gear can be determined based on the same equation as Equation 2-3 for each pinion gear and the pitch circle diameter A of the bull gear 11 obtained by Equations 2-1 and 2-2. Furthermore, similarly to Condition 2-5, a relative position of each pinion gear is determined such that a plurality of pinion center-to-center distances of a plurality of pinion gears are the same as a plurality of reference pinion reference center-to-center distances at the reference frequency fs. For example, in a case where three pinion gears are provided, a relative position of each pinion gear is determined such that the pinion center-to-center distances between a first pinion gear and a second pinion gear, between the second pinion gear and a third pinion gear, and between the third pinion gear and the first pinion gear are the same as a reference pinion center-to-center distance at the corresponding reference frequency fs. By the above, even in a case where a frequency of a power supply changes, it is possible to prevent main body size of the centrifugal compressor 1 from changing.

Second Embodiment

The manufacturing method ST$_{MG}$ and the designing method ST$_D$ of the gear box 10 and the manufacturing method ST$_{MC}$ of the centrifugal compressor 1 according to the second embodiment will be described with reference to FIGS. 6, 7A, and 7B. As for a configuration of the centrifugal compressor 1, a configuration same as that of the first embodiment except for a configuration illustrated in FIGS. 7A and 7B is employed.

1. Configuration of Gear Box 10

Figure 7A:
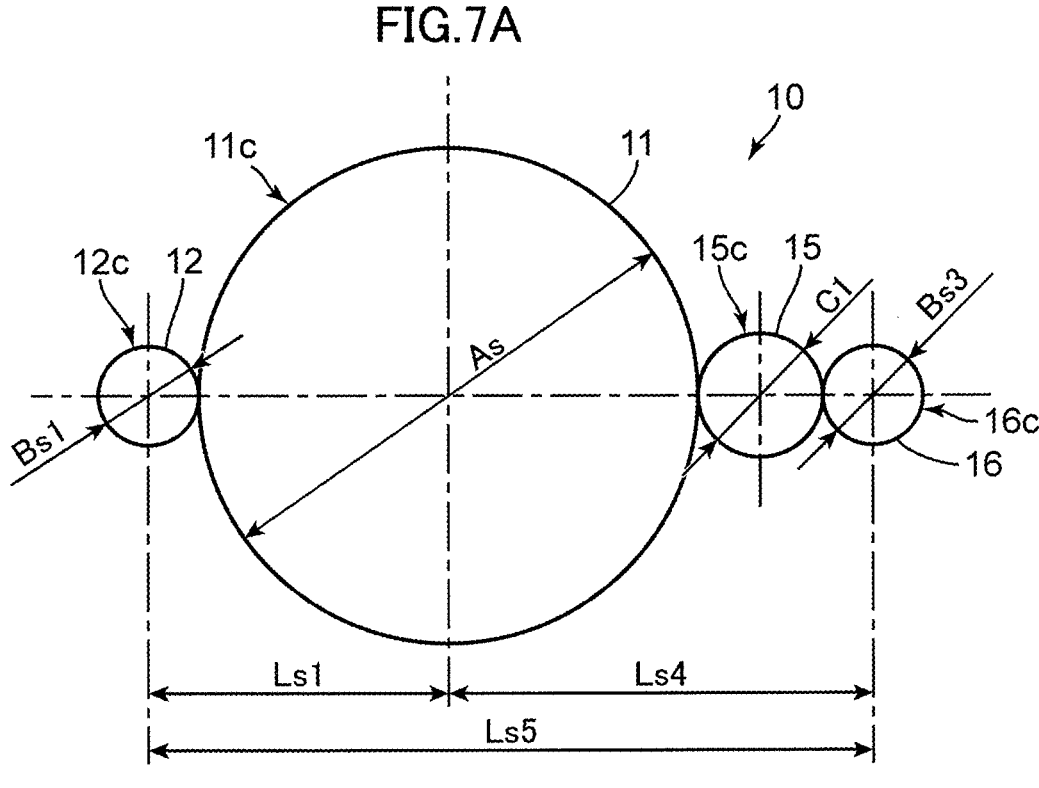
FIG. 7A is a schematic diagram illustrating the bull gear and the pinion gear in a case where a frequency of AC power supplied to the motor is the reference frequency.

As illustrated in FIG. 7A, the gear box 10 to be manufactured using the manufacturing method ST$_{MG}$ according to the present embodiment includes the bull gear 11, the pinion gears 12 and 16, and an idler gear 15. The pinion gear 12 is a gear that meshes with the bull gear 11. The pinion gear 16 is a pinion gear that indirectly meshes with the bull gear 11 via the idler gear 15. Hereinafter, the pinion gear 16 is referred to as "idler side pinion gear 16". One or two of the impellers 40 are attached to one or both end portions of each of the pinion gear 12 and the idler side pinion gear 16 outside the gear case 14. The idler gear 15 and the idler side pinion gear 16 are also pivotally supported by the gear case 14 (see FIG. 1) via a bearing.

2. Manufacturing Method of Centrifugal Compressor 1

Figure 6:
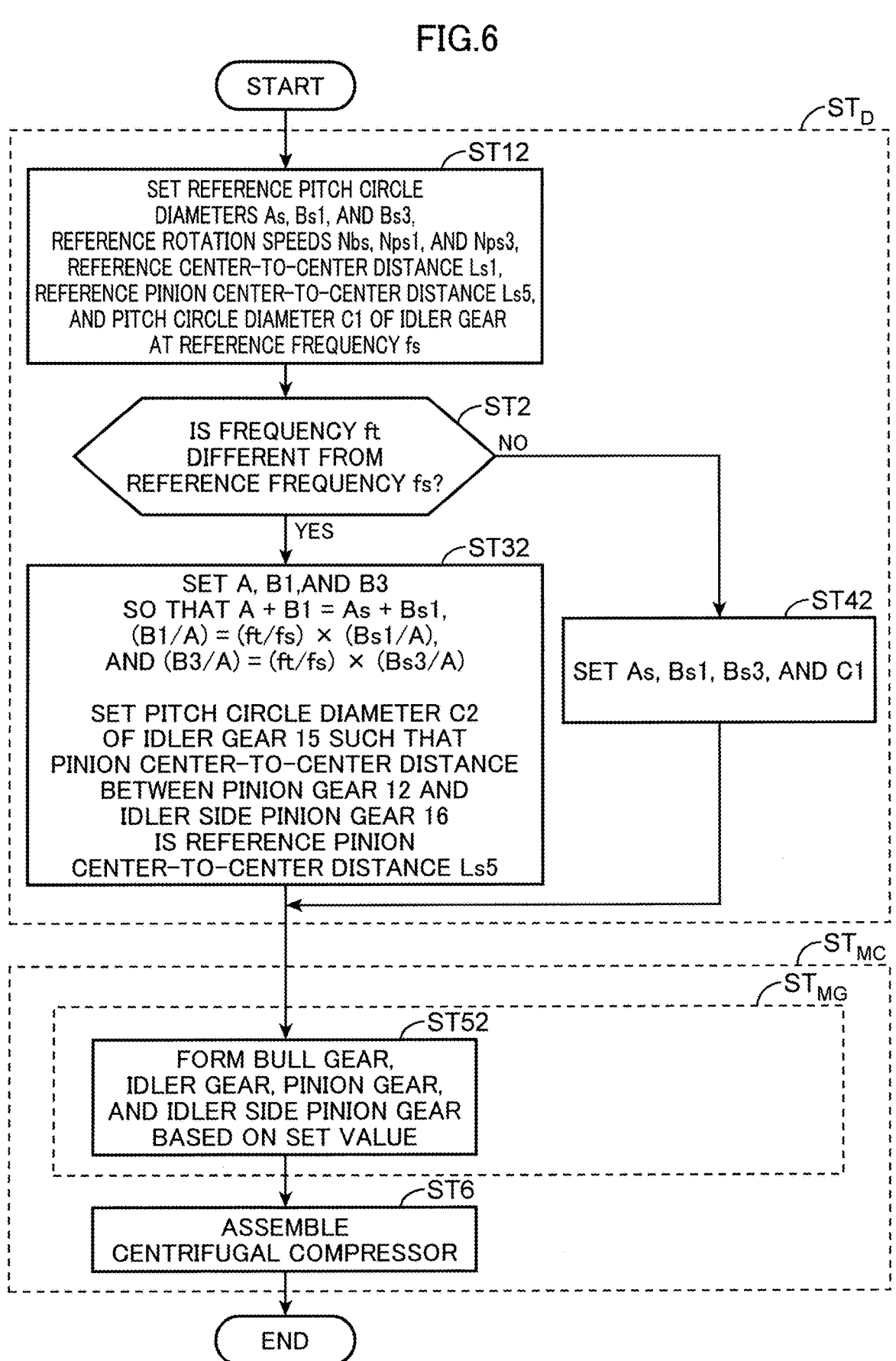
FIG. 6 is a process diagram illustrating the designing method of the gear box and the manufacturing method of the centrifugal compressor according to a second embodiment.
Figure 7B:
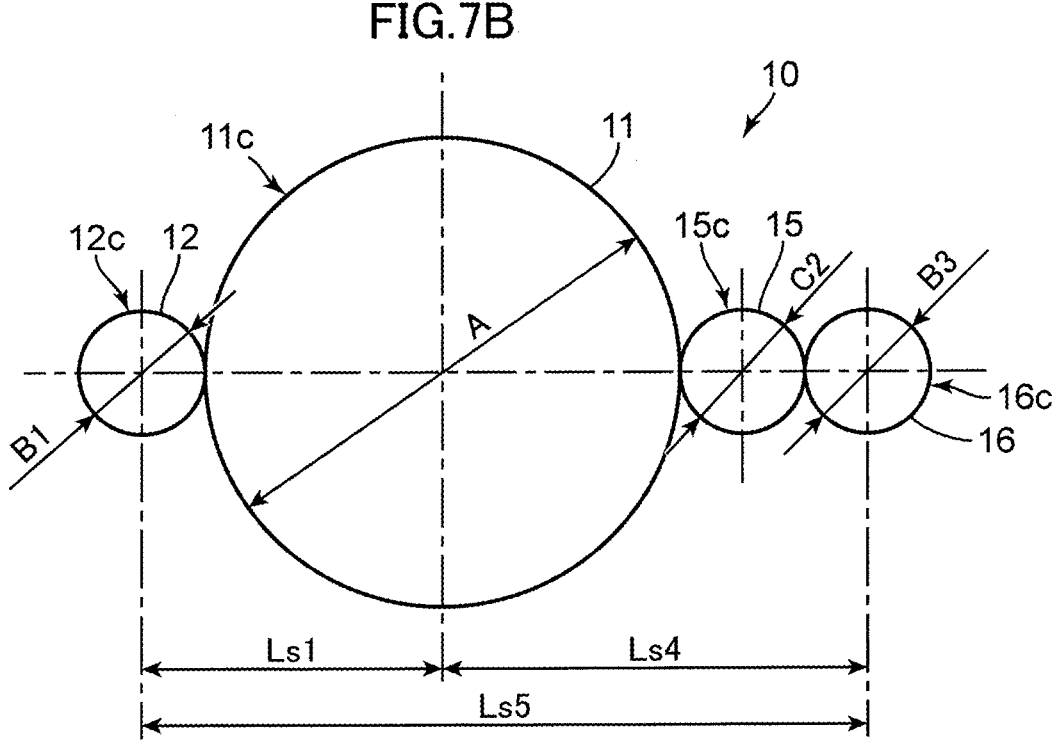
FIG. 7B is a schematic diagram illustrating the bull gear and the pinion gear in a case where the frequency is different from the reference frequency.

As illustrated in FIG. 6, the manufacturing method ST$_{MC}$ of the centrifugal compressor 1 according to the present embodiment forms the bull gear 11, the pinion gear 12, the idler side pinion gear 16, and the idler gear 15 by using a design result determined by the designing method ST$_D$ of the gear box 10 (step ST52). Next, the bull gear 11, the pinion gear 12, the idler side pinion gear 16, and the idler gear 15 are assembled to the gear case 14, the impeller 40, and another component to assemble the centrifugal compressor 1 (step ST6).

10

3. Designing Method ST$_D$ of Gear Box 10

In the designing method ST$_D$ of the gear box 10, in step ST12 (reference setting step), the reference pitch circle diameters As, Bs1, and Bs3 of the bull gear 11, the pinion gear 12, and the idler side pinion gear 16 at the reference frequency fs are set. Furthermore, a reference rotation speed (second reference rotation speed) of the bull gear 11, the pinion gear 12, and the idler side pinion gear 16 is set. The reference center-to-center distance Ls1 and a reference pinion center-to-center distance (first reference pinion center-to-center distance) Ls5 are set. A pitch circle diameter C1 of the idler gear 15 is set.

FIG. 7A is a diagram illustrating a relationship between the bull gear 11, the pinion gear 12, the idler side pinion gear 16, and the idler gear 15 at the reference frequency fs.

The bull gear 11 serving as a reference is set to rotate at a predetermined rotation speed when a frequency of AC power supplied to the motor 62 is the predetermined reference frequency fs (for example, 50 Hz).

In FIG. 7A, a pitch circle of the bull gear 11 is indicated by 11c. A diameter of the pitch circle 11c (reference pitch circle diameter) is indicated by "As". Pitch circles of the pinion gear 12 and the idler side pinion gear 16 are indicated by 12c and 16c. Diameters (reference pitch circle diameters) of the pitch circles 12c and 16c are indicated by "Bs1" and "Bs3", respectively. A reference center-to-center distance between the bull gear 11 and the pinion gear 12 is indicated by "Ls1" similarly to the first embodiment. A reference center-to-center distance between the bull gear 11 and the idler side pinion gear 16 is indicated by "Ls4". A reference pinion center-to-center distance between the pinion gear 12 and the idler side pinion gear 16 is indicated by "Ls5". A pitch circle diameter of the idler gear 15 at the reference frequency fs is indicated by "C1".

Also in the present embodiment, the reference pitch circle diameters Bs1 and Bs3 of the pinion gear 12 and the idler side pinion gear 16 are set so as to rotate at the predetermined reference rotation speed NPs1 and a reference rotation speed (reference rotation speed of the idler side impeller 40 connected to the idler side pinion gear 16) Nps3 with respect to the reference rotation speed Nbs of the bull gear 11 at the reference frequency fs.

As illustrated in FIG. 6, in the designing method ST$_D$ of the gear box 10, in a case where the frequency f is the same as the reference frequency fs (step ST2: NO), the bull gear 11, the pinion gear 12, and the idler side pinion gear 16 are designed using the reference pitch circle diameters As, Bs1, and Bs3, and the idler gear 15 is designed using the pitch circle diameter C1 (step ST42: determination step). Then, steps ST52 and ST6 of the manufacturing method ST$_{MC}$ are executed.

Next, a case where the frequency f is different from the reference frequency fs (for example, 60 Hz) will be described (step ST2: YES). FIG. 7B is a diagram illustrating a relationship between the bull gear 11, the pinion gear 12, the idler side pinion gear 16, and the idler gear 15 at the target frequency ft that is the frequency f different from the reference frequency fs.

In FIG. 7B, in the gear box 10 to be designed, a pitch circle diameter of the bull gear 11 at the target frequency ft is indicated by "A", and pitch circle diameters of the pinion gear 12 and the idler side pinion gear 16 are indicated by "B1" and "B3". The pitch circle diameter of the idler gear 15 is indicated by "C2". The pitch circle diameters A, B1, B3, and C2 are determined based on Conditions 3-1 to 3-4.

(Condition 3-1) A center-to-center distance between the bull gear 11 and the pinion gear 12 is the same as the reference center-to-center distance Ls1 set in step ST11.

Therefore, a relationship below holds similarly to the first embodiment.

$$A+B1=As+Bs1 \qquad \text{(Equation 3-1)}$$

(Condition 3-2) The rotation speed Np1 of the pinion gear 12 at the target frequency ft is the same as the reference rotation speed Nps1, and the rotation speed Nb of the bull gear 11 is (ft/fs)×Nbs.

Therefore, a relationship below holds similarly to the first embodiment.

$$(B1/A)=(ft/fs)\times(Bs1/As) \qquad \text{(Equation 3-2)}$$

The pitch circle diameters A and B1 of the bull gear 11 and the pinion gear 12 are determined based on Equations 3-1 and 3-2.

(Condition 3-3) A rotation speed Np3 at the target frequency ft of the idler side pinion gear 16 is the same as the reference rotation speed Nps3 referred to in step ST12.

Therefore, a relationship below is derived between the idler side pinion gear 16 and the bull gear 11.

$$(B3/A)=(ft/fs)\times(Bs3/As) \qquad \text{(Equation 3-3)}$$

Based on Equation 3-3 and the pitch circle diameter A of the bull gear 11 determined based on Equations 3-1 and 3-2, the pitch circle diameter B3 of the idler side pinion gear 16 is determined.

(Condition 3-4) A pinion center-to-center distance between the pinion gear 12 and the idler side pinion gear 16 is the same as the reference pinion center-to-center distance Ls5.

Based on Condition 3-4, the pitch circle diameter C2 of the idler gear 15 is determined such that a relative position between the pinion gear 12 and the idler side pinion gear 16 is fixed (step ST32: determination step). Note that the pitch circle diameter C2 may be the same as C1. A position of a center axis of the idler gear 15 may deviate from a position of a center axis of the idler gear 15 in the reference setting step.

4. Advantageous Effect

In the manufacturing method ST$_{MG}$ of the gear box 10 according to the present embodiment, even if a rotation speed of the bull gear 11 is changed by a difference in a frequency of a power supply, rotation speeds of the pinion gear 12 and the idler side pinion gear 16 can be made the same as the reference rotation speeds Nps1 and Nps3, and a pinion center-to-center distance between the pinion gear 12 and the idler side pinion gear 16 can be made the same as the reference pinion center-to-center distance Ls5. A relative position between the pinion gear 12 and the idler side pinion gear 16 can also be the same. Therefore, in the manufacturing method ST$_{MG}$ of the gear box 10 according to the present embodiment, it is possible to prevent main body size of the centrifugal compressor 1 from changing, and it is possible to achieve commonization of layouts of auxiliary components such as the pipe 61.

The designing method ST$_D$ according to the present embodiment can be used for determining a pitch circle diameter and a rotation speed of an idler side pinion gear meshing with each idler gear and determining a relative position between the pinion gear 12 and the idler side pinion gear in the manufacturing method of the gear box 10 including a plurality of idler gears.

Variation of Second Embodiment

The designing method ST$_D$ of the gear box 10 according to a variation of the second embodiment will be described with reference to FIGS. 8, 9A, and 9B.

Figure 9A:
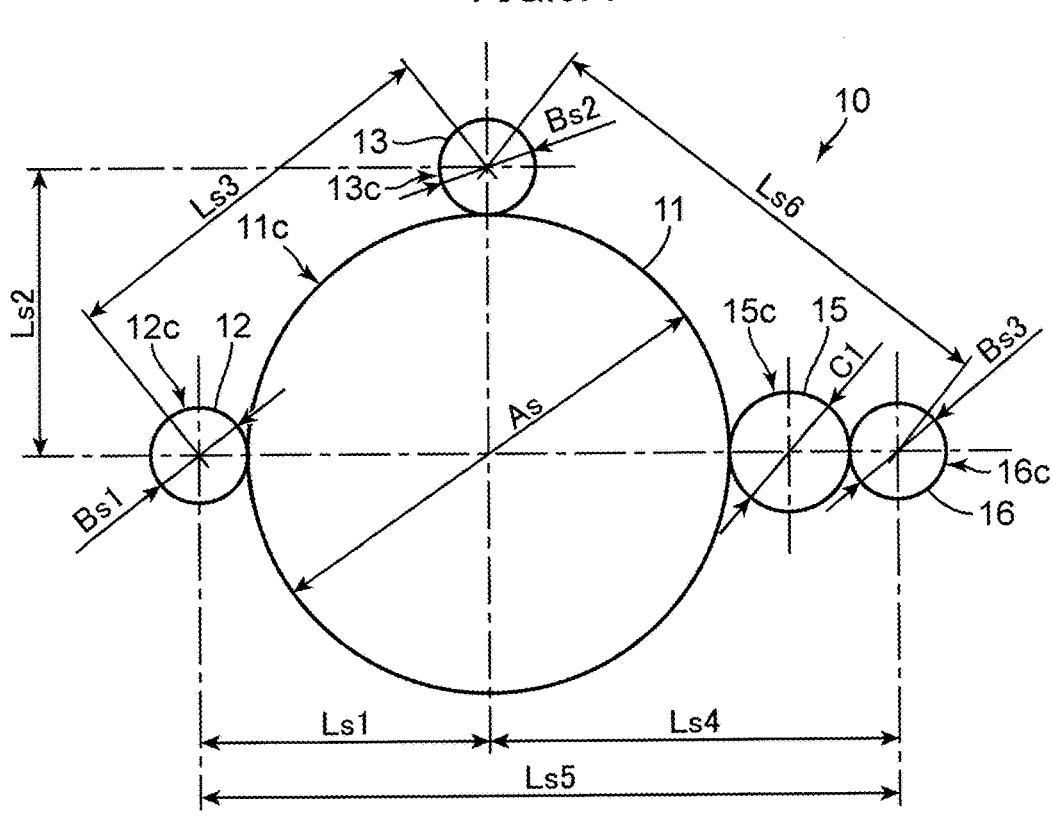
FIG. 9A is a schematic diagram illustrating the bull gear and the pinion gear in a case where a frequency of AC power supplied to the motor is the reference frequency.

FIG. 9A is a diagram illustrating a relationship between the bull gear 11, the pinion gears 12 and 13, the idler side pinion gear 16, and the idler gear 15 at the reference frequency fs. In the gear box 10 to be designed by the designing method ST$_D$ according to the present variation, two of the pinion gears 12 and 13 are arranged to be shifted from each other by 90 degrees with respect to the bull gear 11. Other configurations are the same as those of the second embodiment. Note that arrangement of the pinion gears 12 and 13 with respect to the bull gear 11 may be optionally set. Although not illustrated, the impeller 40 is connected to each of the pinion gears 12 and 13 and the idler side pinion gear 16.

Figure 8:
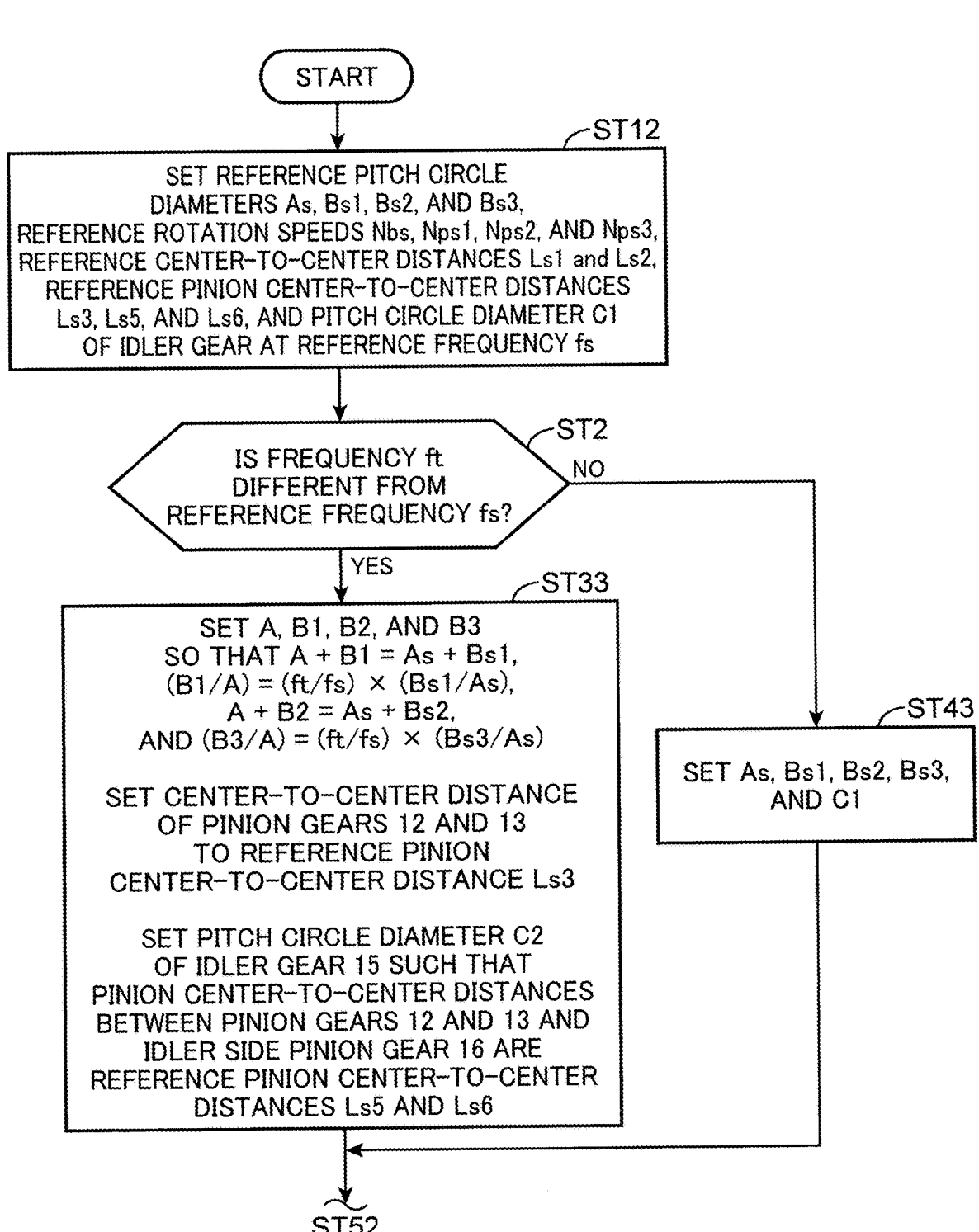
FIG. 8 is a process diagram illustrating a designing method of the gear box and a manufacturing method of the centrifugal compressor according to a variation of the second embodiment.
Figure 9B:
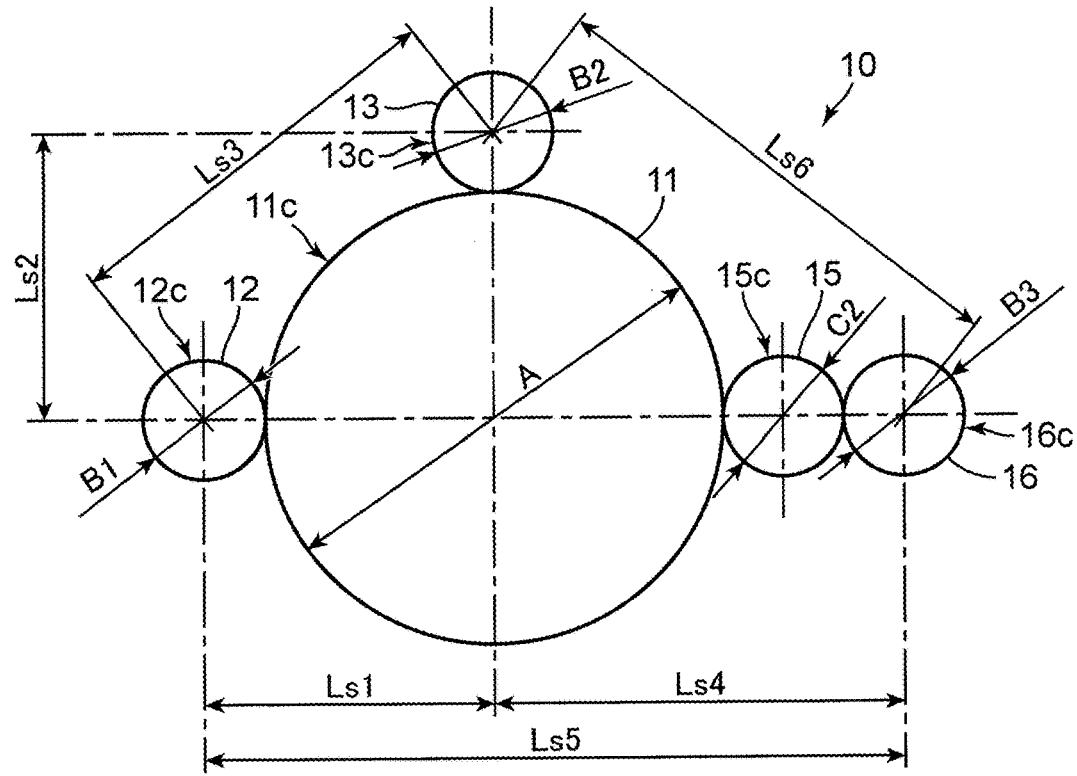
FIG. 9B is a schematic diagram illustrating the bull gear and the pinion gear in a case where the frequency is different from the reference frequency.

In the designing method ST$_D$ of the gear box 10, first, in step ST12 (reference setting step) illustrated in FIG. 8, the reference pitch circle diameters As, Bs1, Bs2, and Bs3 of the bull gear 11, the pinion gears 12 and 13, and the idler side pinion gear 16 at the reference frequency fs are set. A reference rotation speed of the bull gear 11, the pinion gears 12 and 13, and the idler side pinion gear 16 is set. A pitch circle diameter C1 of the idler gear 15 is set.

Further, the reference center-to-center distances Ls1 and Ls2 between the bull gear 11 and the pinion gears 12 and 13 are set. Furthermore, in the present variation, as illustrated in FIG. 9A, a plurality of types of reference pinion center-to-center distances are set, and specifically, a reference pinion center-to-center distance (second reference pinion center-to-center distance) Ls3 (first type) between the pinion gears 12 and 13 meshing with the bull gear 11 and the reference pinion center-to-center distances Ls5 and Ls6 (second type) between the pinion gears 12 and 13 and the idler side pinion gear are set. The reference pinion center-to-center distance Ls6 is "third reference pinion center-to-center distance".

Next, it is determined whether or not the frequency f of power is the same as the reference frequency fs (step ST2). In a case where the frequency f is the same as the reference frequency fs (step ST2: NO), the bull gear 11, the pinion gears 12 and 13, and the idler side pinion gear 16 are designed using the reference pitch circle diameters As, Bs1, Bs2, and Bs3, and the idler gear 15 is designed using the pitch circle diameter C1 (step ST43: determination step). Then, steps ST52 and ST6 (see FIG. 6) of the manufacturing method ST$_{MC}$ are executed.

Next, a case where the frequency f (for example, 60 Hz) is different from the reference frequency fs will be described (step ST2: YES). FIG. 9B is a diagram illustrating a relationship between the bull gear 11, the pinion gears 12 and 13, the idler side pinion gear 16, and the idler gear 15 at the target frequency ft that is the frequency f different from the reference frequency fs. The pitch circle diameters A, B1, B2, B3, and C2 are determined based on Conditions 4-1 to 4-5.

(Condition 4-1) A center-to-center distance between the bull gear 11 and the pinion gear 12 is the same as the reference center-to-center distance Ls1 referred to in step ST12.

Therefore, a relationship below holds similarly to the first embodiment.

$$A+B1=As+Bs1 \qquad \text{(Equation 4-1)}$$

(Condition 4-2) The rotation speed Np1 of the pinion gear 12 at the target frequency ft is the same as the reference rotation speed Nps, and the rotation speed Nb of the bull gear 11 is (ft/fs)×Nbs.

Therefore, a relationship below holds similarly to the first embodiment.

$$(B1/A)=(ft/fs)\times(Bs1/As) \qquad \text{(Equation 4-2)}$$

(Condition 4-3) A center-to-center distance between the bull gear 11 and another one of the pinion gear 13 is the same as the reference center-to-center distance Ls2 set in step ST12.

(Condition 4-4) A rotation speed Np2 of another one of the pinion gear 13 at the target frequency ft is the same as the reference rotation speed (third reference rotation speed) Nps2 referred to in step ST12, and the rotation speed Nb of the bull gear 11 is (ft/fs)×Nbs.

Based on Condition 4-3, Equation 4-3 similar to Equation 4-1 is established.

$$A+B2=As+Bs2 \qquad \text{(Equation 4-3)}$$

The pitch circle diameters A, B1, and B2 can be determined based on Equations 4-1 to 4-3. Note that since Equation 4-4 similar to Equation 4-2 is established based on Condition 4-4, Equation 4-4 may be used instead of Equation 4-3.

$$(B2/A)=(ft/fs)\times(Bs2/As) \qquad \text{(Equation 4-4)}$$

(Condition 4-5) A pinion center-to-center distance between two of the pinion gears 12 and 13 is the same as the reference pinion center-to-center distance Ls3.

Arrangement of the pinion gears 12 and 13 is determined such that a relative position between the pinion gears is fixed based on Condition 4-5.

(Condition 4-6) The rotation speed Np3 at the target frequency ft of the idler side pinion gear 16 is the same as the reference rotation speed Nps3 at the reference frequency fs.

Therefore, a relationship below is derived between the idler side pinion gear 16 and the bull gear 11.

$$(B3/A)=(ft/fs)\times(Bs3/As) \qquad \text{(Equation 4-5)}$$

Based on Equation 4-5 and the pitch circle diameter A determined based on Equations 4-1 to 4-3, the pitch circle diameter B3 of the idler side pinion gear 16 can be determined. Note that Equation 4-6 may be used instead of Equation 4-5 on the condition that a center-to-center distance of the bull gear 11 and the idler side pinion gear 16 is the same as the reference center-to-center distance Ls4.

$$As+Bs3=A+B3 \qquad \text{(Equation 4-6)}$$

(Condition 4-7) Pinion center-to-center distances between the pinion gear 12 and the idler side pinion gear 16 and between the pinion gear 13 and the idler side pinion gear 16 are the same as the reference pinion center-to-center distances Ls5 and Ls6, respectively.

Based on Condition 4-7, the pitch circle diameter C2 of the idler gear 15 is determined such that a relative position between the pinion gears 12 and 13 and the idler side pinion gear 16 is fixed (step ST33: determination step). Note that the pitch circle diameter C2 may be the same as C1. A position of a center axis of the idler gear 15 may deviate from a position of a center axis of the idler gear 15 in the reference setting step.

Also in the manufacturing method $ST_{MG}$ of the gear box 10 according to the present variation, it is possible to prevent main body size of the centrifugal compressor 1 from changing, and it is possible to achieve commonization of layouts of auxiliary components such as the pipe 61.

In a variation of the second embodiment, three or more pinion gears meshing with the bull gear 11 may be provided. In a case where the target frequency ft is different from the reference frequency fs (step ST2: YES), in step ST33 (determination step), a pitch circle diameter of each pinion gear is determined based on an equation similar to Equation 4-3 for each pinion gear and the pitch circle diameter A of the bull gear 11 obtained by Equations 4-1 and 4-2. Furthermore, similarly to Condition 4-5, a relative position of each pinion gear is determined such that a plurality of pinion center-to-center distances of a plurality of pinion gears are the same as a plurality of reference pinion reference center-to-center distances at the reference frequency fs.

The designing method $ST_D$ according to the present variation can be used for determining a pitch circle diameter and a rotation speed of an idler side pinion gear meshing with each idler gear and determining a relative position between two of the pinion gears 12 and 13 and the idler side pinion gear in the manufacturing method of the gear box 10 including a plurality of idler gears.

Another Variation of Second Embodiment

The designing method $ST_D$ of the gear box 10 according to another variation of the second embodiment will be described with reference to FIGS. 10 and 11. In description below, only a difference from the designing method described with reference to FIG. 6 will be described. Other designing methods are similar to the designing methods described with reference to FIG. 6.

Figure 11:
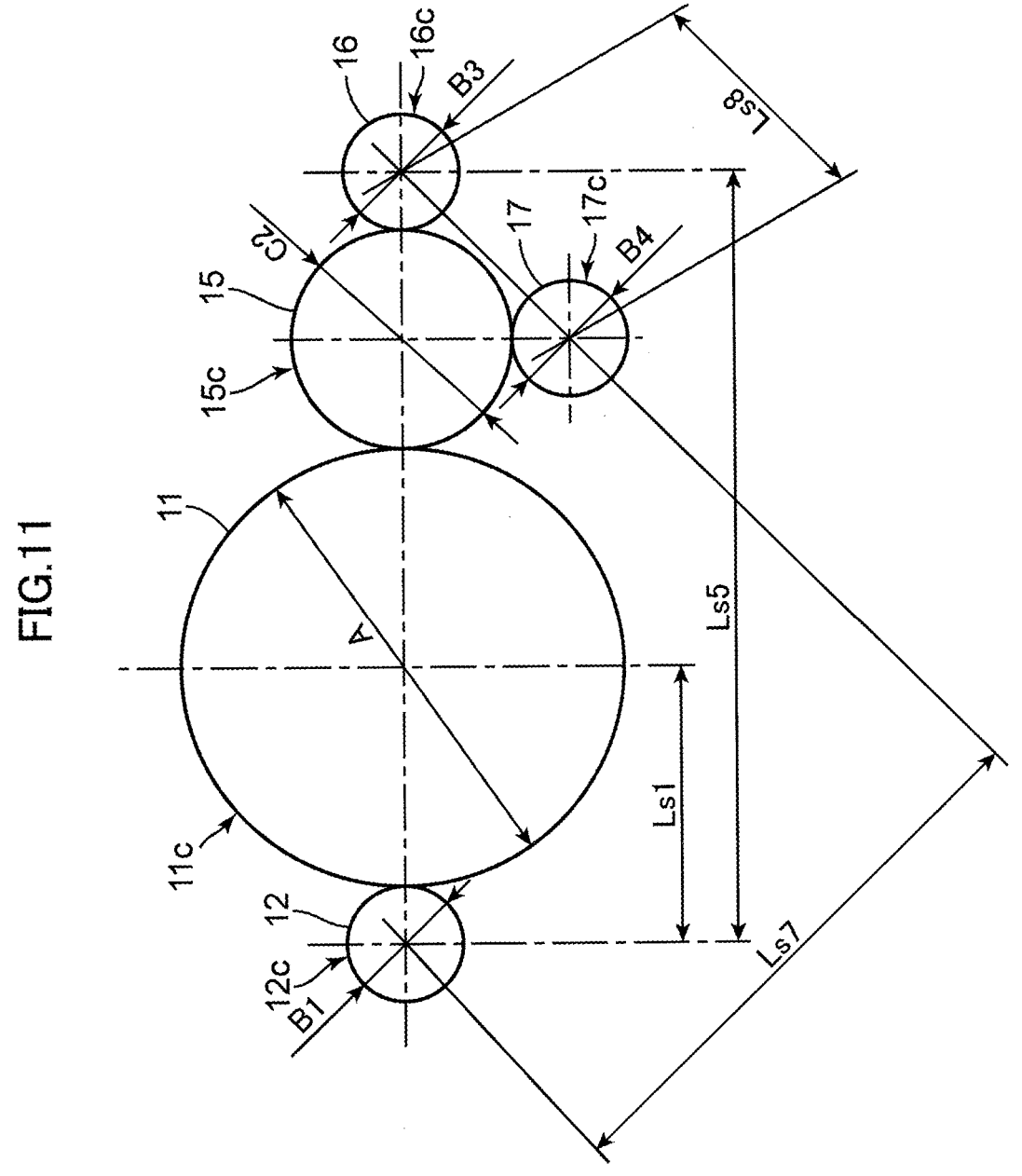
FIG. 11 is a schematic diagram illustrating the bull gear and the pinion gear in a case where the frequency is different from the reference frequency.

In the gear box 10 to be designed by the designing method $ST_D$ according to the present variation, as illustrated in FIG. 11, in addition to the idler side pinion gear 16, another one, an idler side pinion gear 17 meshing with the idler gear 15, may be provided. Note that FIG. 11 illustrates a configuration of the bull gear 11 and the like in a case where the target frequency ft is different from the reference frequency fs.

In step ST13 (reference setting step), a reference pitch circle diameter Bs4 of the idler side pinion gear 17 at the reference frequency fs is set in addition to the reference pitch circle diameters As, Bs1, and Bs3. In addition to reference rotation speeds of the bull gear 11, the pinion gear 12, and the idler side pinion gear 16, a reference rotation speed (fourth reference rotation speed) of the idler side pinion gear 17 is set. In addition to the reference center-to-center distance Ls1 and the reference pinion center-to-center distance Ls5, a reference pinion center-to-center distance Ls8 (third type) between the idler side pinion gears 16 and 17 is set as a type different from the reference pinion center-to-center distance illustrated in FIGS. 9A and 9B. The pitch circle diameter C1 of the idler gear 15 is also set.

In a case where the target frequency ft is different from the reference frequency fs (step ST2: YES), Equation 5-3 similar to Equation 3-3 is derived for the idler side pinion gear 17 in step ST34 (determination step).

$$(B4/A)=(ft/fs)\times(Bs4/As) \qquad \text{(Equation 5-3)}$$

A pitch circle diameter B4 of the idler side pinion gear 17 is determined based on Equation 5-3 and the pitch circle diameter A of the bull gear 11 obtained by Equations 3-1 and 3-2. Note that Equation 5-4 may be used instead of Equation 5-3 on the condition that a center-to-center distance between the bull gear 11 and the idler side pinion gear 17 is the same as a reference center-to-center distance between them at a reference frequency.

$$As + Bs4 = A + B4 \qquad \text{(Equation 5-4)}$$

Furthermore, the pitch circle diameter C2 of the idler gear 15 is determined such that a relative position between the pinion gear 12 and each of the idler side pinion gears 16 and 17 is fixed. Determination of the pitch circle diameter C2 is based on the condition that a pinion center-to-center distance between the pinion gear 12 and each of the idler side pinion gears 16 and 17 is the same as the reference pinion center-to-center distances Ls5 and Ls7 at the reference frequency fs, similarly to Condition 3-4. Note that the pitch circle diameter C2 may be the same as C1. A position of a center axis of the idler gear 15 may deviate from a position of a center axis of the idler gear 15 in the reference setting step.

In the above description, the reference pinion center-to-center distance Ls7 is "fourth reference pinion center-to-center distance".

In the designing method $ST_D$ according to the present variation, a condition below is further added.

(Condition 5-1) A pinion center-to-center distance between the idler side pinion gears 16 and 17 is the same as the reference pinion center-to-center distance (fifth reference pinion center-to-center distance) Ls8 at the reference frequency fs.

Based on Condition 5-1, a relative position of each of the idler side pinion gears 16 and 17 is determined.

Also in the manufacturing method $ST_{MG}$ of the gear box 10 according to the present variation, it is possible to prevent main body size of the centrifugal compressor 1 from changing.

The designing method $ST_D$ according to the present variation can also be applied to manufacture of the gear box 10 including three or more idler side pinion gears meshing with the idler gear 15. In a case where the target frequency ft is different from the reference frequency fs, a relative position of each idler side pinion gear is determined such that a pinion center-to-center distance between the three or more idler side pinion gears is the same as a reference pinion center-to-center distance at the corresponding reference frequency fs.

The designing method $ST_D$ according to the present variation may also be applied to a manufacturing method of the gear box 10 including a plurality of pinion gears meshing with the bull gear 11. In this case, similarly to Condition 3-4, the pitch circle diameter C2 of the idler gear 15 is determined such that a pinion center-to-center distance between each pinion gear and the idler side pinion gears 16 and 17 is the same as a reference pinion center-to-center distance at the reference frequency fs.

Further, in the manufacturing method of the gear box 10 including two or more of the idler gears 15, the designing method $ST_D$ according to the present variation may be applied to an idler side pinion gear meshing with each idler gear.

As described above, the reference setting step and the determination step described above are executed for each of a plurality of idler gears, a plurality of pinion gears, and a plurality of idler side pinion gears, and various gears are designed and formed, so that main body size of the centrifugal compressor 1 can be prevented from changing even in a case where a frequency of a power supply changes.

It should be understood that the embodiment disclosed herein is illustrative in all respects and is not restrictive. The present invention is not limited to the above embodiment, and various modifications, improvements, and the like can be made without departing from the gist of the present invention.

The manufacturing method according to the above embodiment may be applied to other rotating machines such as a turbine and a pump.

Summary

The manufacturing method according to the above embodiment is a manufacturing method of a gear box (10) for a rotating machine (1) for transmitting power of a motor. The gear box (10) includes a bull gear (11) connected to an input shaft of a motor, and a pinion gear (12) meshing with the bull gear (11).

The manufacturing method according to the above embodiment includes a step of forming the bull gear (11) and a step of forming the pinion gear (12). In the manufacturing method according to the present aspect, the step of forming the bull gear (11) and the step of forming the pinion gear (12) are executed using a design result determined through a design process (using a designing method) including a reference setting step and a determination step. That is, the bull gear (11) and the pinion gear (12) are formed using a design result determined by the designing method including the reference setting step and the determination step. In the reference setting step, a first reference center-to-center distance (Ls1) and a first reference rotation speed defined in a case where a frequency of AC power supplied to the motor is a predetermined frequency are set. The first reference center-to-center distance (Ls1) is a distance between a center axis of the bull gear (11) and a center axis of the pinion gear (12). The first reference rotation speed is a rotation speed of the pinion gear (12) defined in a case where a frequency of AC power supplied to the motor is the predetermined frequency.

In the determination step, in a case where a frequency of AC power supplied to the motor is a frequency different from the predetermined frequency, pitch circle diameters (A and B) of the bull gear (11) and the pinion gear (12) are determined so as to satisfy Conditions a1 and a2 below.

(Condition a1) A center-to-center distance, which is a distance between the center axis of the bull gear (11) and the center axis of the pinion gear (12), is set to be the same as the first reference center-to-center distance (Ls1).

(Condition a2) A rotation speed of the pinion gear (12) is set to be the same as the first reference rotation speed.

In the manufacturing method according to the present aspect, the step of forming the bull gear (11) and the step of forming the pinion gear (12) are executed using a design result determined through a design process (using a designing method) including a reference setting step and the determination step.

In the manufacturing method of the gear box (10), even if a rotation speed of the bull gear (11) changes due to a difference in a frequency of a power supply, a rotation speed of the pinion gear (12) can be made the same as a reference rotation speed and a center-to-center distance can be made the same as the first reference center-to-center distance (Ls1), so that main body size of the rotating machine (1) can be prevented from changing. As a result, commonization of auxiliary components such as a pipe can be achieved.

In the manufacturing method according to the above embodiment, the gear box (10) for the rotating machine (1) may further include another pinion gear (13) meshing with the bull gear (11). In this case, in the reference setting step, a second reference center-to-center distance (Ls2), a reference pinion center-to-center distance (Ls3), and a second reference rotation speed defined in a case where a frequency of AC power supplied to the motor is the predetermined frequency may be further set. The second reference center-to-center distance (Ls2) is a distance between the center axis of the bull gear (11) and a center axis of the another pinion gear (13). The reference pinion center-to-center distance (Ls3) is a distance between the center axis of the pinion gear (12) and the center axis of the another pinion gear (13). The second reference rotation speed is a rotation speed of the another pinion gear (13).

In the manufacturing method according to the above embodiment, in the determination step, in a case where a frequency of AC power supplied to the motor is a frequency different from the predetermined frequency, a pitch circle diameter (B2) of the another pinion gear (13) may be further determined so as to satisfy Conditions b1 and b2 below.

(Condition b1) A center-to-center distance, which is a distance between the center axis of the bull gear (11) and the center axis of the another pinion gear (13), is set to be the same as the second reference center-to-center distance (Ls2).

(Condition b2) A rotation speed of the another pinion gear (13) is set to be the same as the second reference rotation speed.

Furthermore, in the manufacturing method according to the above embodiment, in the determination step, in a case where a frequency of AC power supplied to the motor is a frequency different from the predetermined frequency, a relative position between the pinion gears (12 and 13) may be further determined so as to satisfy Condition b3 below.

(Condition b3) A pinion center-to-center distance, which is a distance between the center axis of the pinion gear (12) and the center axis of the another pinion gear (13), is set to be the same as the reference pinion center-to-center distance (Ls3).

In the manufacturing method of the gear box (10), even if a rotation speed of the bull gear (11) changes due to a difference in a frequency of a power supply, it is possible to prevent main body size of the rotating machine (1) from changing. As a result, also in manufacture of the gear box (10) including a plurality of the pinion gears (12 and 13), it is possible to achieve commonization of auxiliary components such as a pipe.

The manufacturing method according to the above embodiment is a manufacturing method of a gear box (10) for a rotating machine (1) for transmitting power of a motor. The gear box (10) includes the bull gear (11) connected to an input shaft of a motor, the pinion gear (12) meshing with the bull gear (11), an idler gear (15) meshing with the bull gear (11), and an idler side pinion gear (16) meshing with the idler gear (15).

The manufacturing method according to the above embodiment includes a reference setting step, a determination step, a step of forming the bull gear (11), a step of forming the pinion gear (12), a step of forming the idler gear (15), and a step of forming the idler side pinion gear (16).

In the manufacturing method according to the above embodiment, in the reference setting step, a first reference center-to-center distance (Ls1), a first reference pinion center-to-center distance (Ls5), a first reference rotation speed, and a second reference rotation speed defined in a case where a frequency of AC power supplied to the motor is a predetermined frequency are set. The first reference center-to-center distance is a distance between a center axis of the bull gear (11) and a center axis of the pinion gear (12). The first reference pinion center-to-center distance (Ls5) is a distance between a center axis of the pinion gear (12) and a center axis of the idler side pinion gear (16). The first reference rotation speed is a rotation speed of the pinion gear (12). The second reference rotation speed is a rotation speed of the idler side pinion gear (16).

In the manufacturing method according to the above embodiment, in the determination step, in a case where a frequency of AC power supplied to the motor is a frequency different from the predetermined frequency, pitch circle diameters (A, B1, and B3) of the bull gear (11), the pinion gear (12), and the idler side pinion gear (16) are determined so as to satisfy Conditions c1 and c2 below.

(Condition c1) A center-to-center distance that is a distance between the center axis of the bull gear (11) and the center axis of the pinion gear (12) is set to be the same as the first reference center-to-center distance (Ls1), and a rotation speed of the pinion gear (12) is set to be the same as the first reference rotation speed.

(Condition c2) A rotation speed of the idler side pinion gear (16) is set to be the same as the second reference rotation speed.

Further, in the determination step, in a case where a frequency of AC power supplied to the motor is a frequency different from the predetermined frequency, a pitch circle diameter (C2) of the idler gear (15) is determined so as to satisfy Condition c3 below.

(Condition c3) A pinion center-to-center distance, which is a distance between the center axis of the pinion gear (12) and the center axis of the idler side pinion gear (16), is set to be the same as the first reference pinion center-to-center distance (Ls5).

In the manufacturing method according to the above embodiment, a step of forming the bull gear (11), a step of forming the pinion gear (12), a step of forming the idler gear (15), and a step of forming the idler side pinion gear (16) are executed using a design result determined through a design process (using a designing method) including a reference setting step and the determination step.

By using the manufacturing method of the gear box (10), also in the gear box (10) including the idler side pinion gear (16) with the idler gear (15) interposed between the idler side pinion gear (16) and the bull gear (11), it is possible to prevent main body size of the rotating machine (1) from changing, and it is possible to achieve commonization of auxiliary components such as a pipe.

In the manufacturing method according to the above embodiment, the gear box (10) for the rotating machine (1) may further include another pinion gear (13) meshing with the bull gear (11). In this case, in the reference setting step, a second reference center-to-center distance (Ls2), a second reference pinion gear center-to-center distance (Ls3), a third reference pinion center-to-center distance (Ls6), and a third reference rotation speed defined in a case where a frequency of AC power supplied to the motor is the predetermined frequency may be set. The second reference center-to-center distance (Ls2) is a distance between a center axis of the bull gear (11) and a center axis of the another pinion gear (13). The second reference pinion center-to-center distance (Ls3) is a distance between the center axis of the pinion gear (12) and the center axis of the another pinion gear (13). Further, the third reference pinion center-to-center distance (Ls6) is a distance between the center axis of the idler side pinion gear (16) and the center axis of the another pinion gear (13). The third reference rotation speed is a rotation speed of the another pinion gear (13).

In the manufacturing method according to the above embodiment, in the determination step, in a case where a frequency of AC power supplied to the motor is a frequency different from the predetermined frequency, a pitch circle diameter (B2) of the pinion gear (13) may be determined so as to satisfy Conditions d1 and d2 below.

(Condition d1) A center-to-center distance, which is a distance between the center axis of the bull gear (11) and the center axis of the another pinion gear (13), is set to be the same as the second reference center-to-center distance (Ls2).

(Condition d2) A rotation speed of the pinion gear (13) is set to be the same as the first reference rotation speed.

Further, in the manufacturing method according to the above embodiment, in the determination step, in a case where a frequency of AC power supplied to the motor is a frequency different from the predetermined frequency, a relative position between the pinion gears (12 and 13) may be further determined so as to satisfy Condition d3 below.

(Condition d3) A pinion center-to-center distance, which is a distance between the center axis of the pinion gear (12) and the center axis of the another pinion gear (13), is set to be the same as the second reference pinion center-to-center distance (Ls3).

Further, in the manufacturing method according to the embodiment, in the determination step, in a case where a frequency of AC power supplied to the motor is a frequency different from the predetermined frequency, the pitch circle diameter (C2) of the idler gear (15) may be determined so as to satisfy Conditions d4 and d5 below.

(Condition d4) A pinion center-to-center distance, which is a distance between the center axis of the pinion gear (12) and the center axis of the idler side pinion gear (16), is set to be the same as the first reference pinion center-to-center distance (Ls5).

(Condition d5) A pinion center-to-center distance, which is a distance between the center axis of the another pinion gear (13) and the center axis of the idler side pinion gear (16), is set to be the same as the third reference pinion center-to-center distance (Ls6).

In the manufacturing method of the gear box (10), even if a rotation speed of the bull gear (11) changes due to a difference in a frequency of a power supply, it is possible to prevent main body size of the rotating machine (1) from changing. As a result, also in manufacture of the gear box (10) including a plurality of the pinion gears (12 and 13), the idler side pinion gear (16), and the idler gear (15), it is possible to achieve commonization of auxiliary components such as a pipe.

In the manufacturing method according to the above embodiment, the gear box (10) for the rotating machine (1) may further include another idler side pinion gear (17) meshing with the idler gear (15). In this case, in the reference setting step, a fourth reference pinion center-to-center distance (Ls7), a fourth reference rotation speed, and a fifth reference pinion center-to-center distance (Ls8) defined in a case where a frequency of AC power supplied to the motor is the predetermined frequency may be further set. The fourth reference pinion center-to-center distance (Ls7) is a distance between a center axis of the pinion gear (12) and a center axis of the another idler side pinion gear (17). The fourth reference rotation speed is a rotation speed of the another idler side pinion gear (17). The fifth reference pinion center-to-center distance (Ls8) is a distance between the center axis of the idler side pinion gear (16) and a center axis of the another idler side pinion gear (17).

In the manufacturing method according to the present embodiment, in the determination step, in a case where a frequency of AC power supplied to the motor is a frequency different from the predetermined frequency, a pitch circle diameter (B4) of the another idler side pinion gear (17) may be determined so as to satisfy Condition e1 below.

(Condition e1) A rotation speed of the another idler side pinion gear (17) is set to be the same as the fourth reference rotation speed.

Further, in the manufacturing method according to the above embodiment, in the determination step, in a case where a frequency of AC power supplied to the motor is a frequency different from the predetermined frequency, a pitch circle diameter (C2) of the idler gear (15) may be determined so as to satisfy Conditions e2 and e3 below.

(Condition e2) The pinion center-to-center distance, which is a distance between the center axis of the pinion gear (12) and the center axis of the idler side pinion gear (16), is set to be the same as the first reference pinion center-to-center distance (Ls5).

(Condition e3) A pinion center-to-center distance, which is a distance between the center axis of the pinion gear (12) and the center axis of the another idler side pinion gear (17), is set to be the same as the fourth reference pinion center-to-center distance (Ls7).

Further, in the manufacturing method according to the above embodiment, in the determination step, in a case where a frequency of AC power supplied to the motor is a frequency different from the predetermined frequency, a relative position of the idler side pinion gears (16 and 17) may be further determined so as to satisfy Condition e4 below.

(Condition e4) A pinion center-to-center distance, which is a distance between the center axis of the idler side pinion gear (16) and a center axis of the another idler side pinion gear (17), is set to be the same as the fifth reference pinion center-to-center distance (Ls8).

The manufacturing method of the rotating machine (1) according to the above embodiment includes a step of manufacturing the gear box (10) by the manufacturing method according to any of the above aspects.

In the manufacturing method of the centrifugal compressor (1) according to the above embodiment, since the gear box (10) is manufactured using the manufacturing method according to the above aspect, a similar effect to the above can be obtained.

In the manufacturing method of the rotating machine (1) according to the above embodiment, the rotating machine (1) may be a centrifugal compressor.

As described above, the manufacturing method according to the above embodiment can manufacture the gear box (10) that can prevent main body size of a rotating machine from changing while keeping a rotation speed of an impeller the same regardless of a frequency of a power supply, and the rotating machine (1) including the gear box (10).

This application is based on Japanese Patent application No. 2024-045495 filed in Japan Patent Office on Mar. 21, 2024, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

The invention claimed is:

1. A manufacturing method of a gear box for a rotating machine for transmitting power of a motor, the gear box including a bull gear connected to an input shaft of the motor and a pinion gear meshing with the bull gear, the manufacturing method comprising:

a step of forming the bull gear; and a step of forming the pinion gear, wherein in the step of forming the bull gear and the step of forming the pinion gear, the bull gear and the pinion gear are formed by using a design result determined through a design process including:

a reference setting step of setting a first reference center-to-center distance and a first reference rotation speed defined in a case where a frequency of AC power supplied to the motor is a predetermined frequency, wherein the first reference center-to-center distance is a distance between a center axis of the bull gear and a center axis of the pinion gear, and the first reference rotation speed is a rotation speed of the pinion gear; and a determination step of determining a pitch circle diameter of the bull gear and the pinion gear such that a center-to-center distance, which is a distance between the center axis of the bull gear and the center axis of the pinion gear, is same as the first reference center-to-center distance and a rotation speed of the pinion gear is same as the first reference rotation speed in a case where a frequency of AC power supplied to the motor is a frequency different from the predetermined frequency.

2. The manufacturing method of a gear box according to claim 1, the gear box for the rotating machine further including another pinion gear meshing with the bull gear, wherein in the reference setting step, a second reference center-to-center distance, a reference pinion center-to-center distance, and a second reference rotation speed defined in a case where a frequency of AC power supplied to the motor is the predetermined frequency are further set, wherein the second reference center-to-center distance is a distance between the center axis of the bull gear and a center axis of the another pinion gear, the reference pinion center-to-center distance is a distance between the center axis of the pinion gear and the center axis of the another pinion gear, and the second reference rotation speed is a rotation speed of the another pinion gear, in a case where a frequency of AC power supplied to the motor is a frequency different from the predetermined frequency, in the determination step, a pitch circle diameter of the another pinion gear is further determined such that a center-to-center distance, which is a distance between the center axis of the bull gear and the center axis of the another pinion gear, is same as the second reference center-to-center distance, and a rotation speed of the another pinion gear is same as the second reference rotation speed, and a relative position between pinion gears is further determined such that a pinion center-to-center distance, which is a distance between the center axis of the pinion gear and the center axis of the another pinion gear, is same as the reference pinion center-to-center distance.

3. A manufacturing method of a rotating machine, the manufacturing method comprising a step of manufacturing a gear box by the manufacturing method according to claim 2.

4. The manufacturing method of a rotating machine according to claim 3, wherein the rotating machine is a centrifugal compressor.

5. A manufacturing method of a rotating machine, the manufacturing method comprising a step of manufacturing a gear box by the manufacturing method according to claim 1.

6. The manufacturing method of a rotating machine according to claim 5, wherein the rotating machine is a centrifugal compressor.

7. A manufacturing method of a gear box for a rotating machine for transmitting power of a motor, the gear box including a bull gear connected to an input shaft of the motor, a pinion gear meshing with the bull gear, an idler gear meshing with the bull gear, and an idler side pinion gear meshing with the idler gear, the manufacturing method comprising:

a step of forming the bull gear;

a step of forming the pinion gear;

a step of forming the idler gear; and a step of forming the idler side pinion gear, wherein in the step of forming the bull gear, the step of forming the pinion gear, the step of forming the idler gear, and the step of forming the idler side pinion gear, the bull gear, the pinion gear, the idler gear, and the idler side pinion gear are formed by using a design result determined through a design process including:

a reference setting step of setting each of a first reference center-to-center distance, a first reference pinion center-to-center distance, a first reference rotation speed, and a second reference rotation speed defined in a case where a frequency of AC power supplied to the motor is a predetermined frequency, wherein the first reference center-to-center distance is a distance between a center axis of the bull gear and a center axis of the pinion gear, the first reference pinion center-to-center distance is a distance between a center axis of the pinion gear and a center axis of the idler side pinion gear, the first reference rotation speed is a rotation speed of the pinion gear, and the second reference rotation speed is a rotation speed of the idler side pinion gear; and a determination step of, in a case where a frequency of AC power supplied to the motor is a frequency different from the predetermined frequency, determining a pitch circle diameter of each of the bull gear, the pinion gear, and the idler side pinion gear such that a center-to-center distance, which is a distance between the center axis of the bull gear and the center axis of the pinion gear, is same as the first reference center-to-center distance, a rotation speed of the pinion gear is same as the first reference rotation speed, and a rotation speed of the idler side pinion gear is same as the second reference rotation speed, and determining a pitch circle diameter of the idler gear such that a pinion center-to-center distance, which is a distance between the center axis of the pinion gear and the center axis of the idler side pinion gear, is same as the first reference pinion center-to-center distance.

8. The manufacturing method of a gear box according to claim 7, the gear box for the rotating machine further including another pinion gear meshing with the bull gear, wherein in the reference setting step, a second reference center-to-center distance, a second reference pinion center-to-center distance, a third reference pinion center-to-center distance, and a third reference rotation speed defined in a case where a frequency of AC power supplied to the motor is the predetermined frequency are further set, wherein the second reference center-to-center distance is a distance between a center axis of the bull gear and a center axis of the another pinion gear, the second reference pinion center-to-center distance is a distance between the center axis of the pinion gear and the center axis of the another pinion gear, the third reference pinion center-to-center distance is a distance between the center axis of the idler side pinion gear and the center axis of the another pinion gear, and the third reference rotation speed is a rotation speed of the another pinion gear, and in a case where a frequency of AC power supplied to the motor is a frequency different from the predetermined frequency, in the determination step, a pitch circle diameter of the pinion gear is further determined such that a center-to-center distance, which is a distance between the center axis of the bull gear and the center axis of the another pinion gear, is same as the second reference center-to-center distance, and a rotation speed of the pinion gear is same as the reference rotation speed, a relative position between each pinion gear is further determined such that a pinion center-to-center distance, which is a distance between the center axis of the pinion gear and the center axis of the another pinion gear, is same as the second reference pinion center-to-center distance, and the pitch circle diameter of the idler gear is determined such that a pinion center-to-center distance, which is a distance between the center axis of the pinion gear and the center axis of the idler side pinion gear, is same as the first reference pinion center-to-center distance, and such that a pinion center-to-center distance, which is a distance between the center axis of the another pinion gear and the center axis of the idler side pinion gear, is same as the third reference pinion center-to-center distance.

9. The manufacturing method of a gear box according to claim 8, the gear box for the rotating machine further comprising another idler side pinion gear meshing with the idler gear, wherein in the reference setting step, a fourth reference pinion center-to-center distance, a fourth reference rotation speed, and a fifth reference pinion center-to-center distance defined in a case where a frequency of AC power supplied to the motor is the predetermined frequency are further set, wherein the fourth reference pinion center-to-center distance is a distance between a center axis of the pinion gear and a center axis of the another idler side pinion gear, the fourth reference rotation speed is a rotation speed of the another idler side pinion gear, and the fifth reference pinion center-to-center distance is a distance between the center axis of the idler side pinion gear and a center axis of the another idler side pinion gear, and in a case where a frequency of AC power supplied to the motor is a frequency different from the predetermined frequency, in the determination step, a pitch circle diameter of the another idler side pinion gear is determined such that a rotation speed of the another idler side pinion gear is same as the fourth reference rotation speed, a pitch circle diameter of the idler gear is determined such that the pinion center-to-center distance, which is a distance between the center axis of the pinion gear and the center axis of the idler side pinion gear, is same as the reference pinion center-to-center distance, and a pinion center-to-center distance, which is a distance between the center axis of the pinion gear and the center axis of the another idler side pinion gear, is same as the fourth reference pinion center-to-center distance, and a relative position of each idler side pinion gear is further determined such that a pinion center-to-center distance, which is a distance between the center axis of the idler side pinion gear and a center axis of the another idler side pinion gear, is same as the fifth reference pinion center-to-center distance.

10. The manufacturing method of a gear box according to claim 7, further comprising another idler side pinion gear meshing with the idler gear, wherein in the reference setting step, a fourth reference pinion center-to-center distance, a fourth reference rotation speed, and a fifth reference pinion center-to-center distance defined in a case where a frequency of AC power supplied to the motor is a predetermined frequency are further set, wherein the fourth reference pinion center-to-center distance is a distance between a center axis of the pinion gear and a center axis of the another idler side pinion gear, the fourth reference rotation speed is a rotation speed of the another idler side pinion gear, and the fifth reference pinion center-to-center distance is a distance between the center axis of the idler side pinion gear and a center axis of the another idler side pinion gear, and in a case where a frequency of AC power supplied to the motor is a frequency different from the predetermined frequency, in the determination step, a pitch circle diameter of the another idler side pinion gear is determined such that a rotation speed of the another idler side pinion gear is same as the fourth reference rotation speed, a pitch circle diameter of the idler gear is determined such that the pinion center-to-center distance, which is a distance between the center axis of the pinion gear and the center axis of the idler side pinion gear, is same as the reference pinion center-to-center distance, and a pinion center-to-center distance, which is a distance between the center axis of the pinion gear and the center axis of the another idler side pinion gear, is same as the fourth reference pinion center-to-center distance, and a relative position of each idler side pinion gear is further determined such that a pinion center-to-center distance, which is a distance between the center axis of the idler side pinion gear and a center axis of the another idler side pinion gear, is same as the fifth reference pinion center-to-center distance.

11. A manufacturing method of a rotating machine, the manufacturing method comprising a step of manufacturing a gear box by the manufacturing method according to claim 7.

12. The manufacturing method of a rotating machine according to claim 11, wherein the rotating machine is a centrifugal compressor.

\* \* \* \* \*